United States Patent
Tanabe et al.

(10) Patent No.: US 8,576,483 B2
(45) Date of Patent: Nov. 5, 2013

(54) MICROSCOPE AND FOCUSING METHOD

(75) Inventors: Norihiro Tanabe, Kanagawa (JP);
Takashi Yamamoto, Tokyo (JP);
Nobuhiro Hayashi, Kanagawa (JP);
Ryu Narusawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 133 days.

(21) Appl. No.: 13/157,718

(22) Filed: Jun. 10, 2011

(65) Prior Publication Data

US 2011/0317259 A1  Dec. 29, 2011

(30) Foreign Application Priority Data

Jun. 28, 2010 (JP) ................... 2010-146128

(51) Int. Cl.
*G02B 21/00* (2006.01)
(52) U.S. Cl.
USPC .......................................... 359/383; 359/368
(58) Field of Classification Search
USPC ........ 359/383, 385, 386, 368, 371; 250/201.3
See application file for complete search history.

(56) References Cited

U.S. PATENT DOCUMENTS

| | | | | |
|---|---|---|---|---|
| 5,932,871 A | * | 8/1999 | Nakagawa et al. | 250/201.3 |
| 6,043,475 A | * | 3/2000 | Shimada et al. | 250/201.3 |
| 6,339,499 B1 | * | 1/2002 | Shirai | 359/383 |
| 7,825,360 B2 | * | 11/2010 | Karasawa et al. | 250/201.2 |
| 2004/0105000 A1 | * | 6/2004 | Yuri | 348/79 |
| 2008/0204865 A1 | * | 8/2008 | Yoneyama et al. | 359/381 |
| 2008/0225278 A1 | * | 9/2008 | Namba et al. | 356/123 |
| 2012/0312957 A1 | * | 12/2012 | Loney et al. | 250/201.3 |

FOREIGN PATENT DOCUMENTS

JP 11-133311 5/1999

* cited by examiner

*Primary Examiner* — Thomas K Pham
*Assistant Examiner* — William M Johnson
(74) *Attorney, Agent, or Firm* — K&L Gates LLP

(57) ABSTRACT

Disclosed herein is a microscope, including: an illumination optical system; a first image creation optical system; a second image creation optical system; an illumination-field-diaphragm focus adjustment section; and a characteristic-quantity computation block, wherein the illumination-field-diaphragm focus adjustment section adjusts the image creation position for the illumination field diaphragm on the basis of the characteristic quantity computed by the characteristic-quantity computation block.

10 Claims, 11 Drawing Sheets

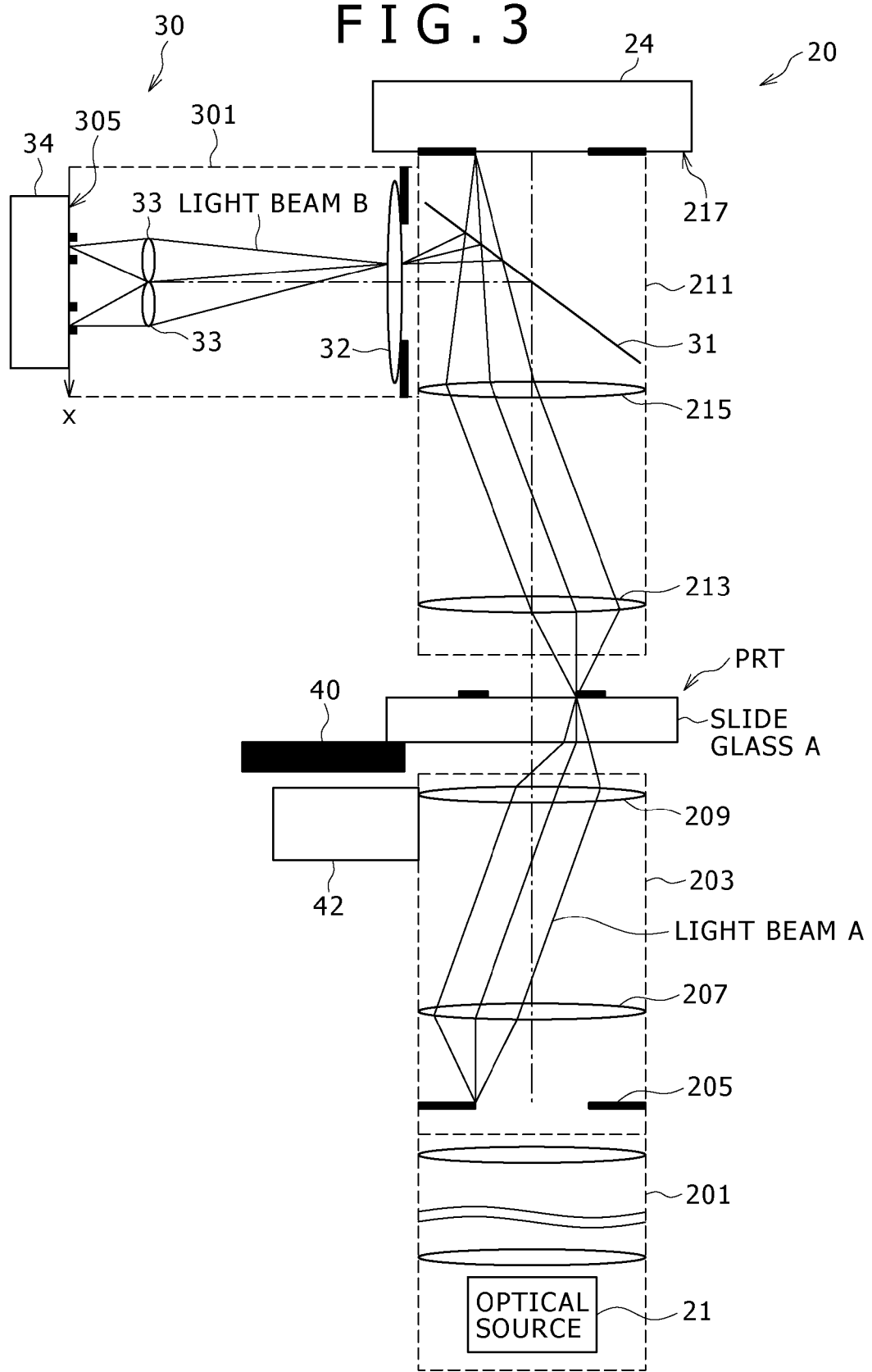

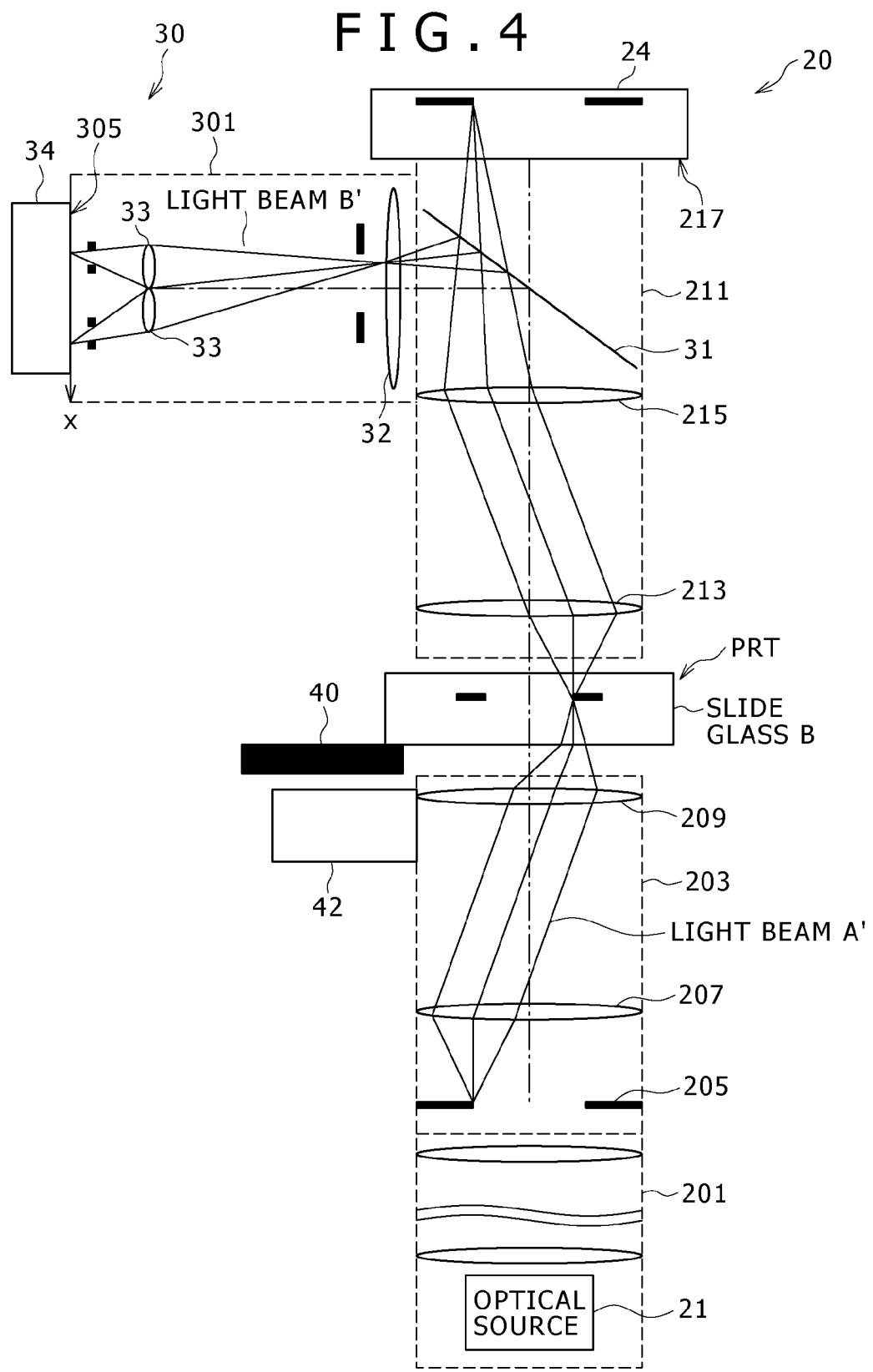

OBSERVED IMAGE ON IMAGE TAKING DEVICE

MICROSCOPE AND FOCUSING METHOD

CROSS REFERENCES TO RELATED APPLICATIONS

The present application claims priority to Japanese Priority Patent Application JP 2010-146128 filed in the Japan Patent Office on Jun. 28, 2010, the entire content of which is hereby incorporated by reference.

BACKGROUND

The present application relates to a microscope and a focusing method.

There is known an existing electrically operated microscope automatically carrying out control in an operation to replace an object lens. The control includes adjustment of a condenser lens, a field diaphragm, an aperture stop, a mechanism for driving a specimen stage in the direction of the optical axis of the object lens, a filter and a power supply for adjusting light generated by an optical source. For details, see Japanese Patent Laid-open No. Hei 11-133311 as Patent Document 1.

SUMMARY

By the way, when a plurality of samples are observed by making use of a microscope, the samples are prepared by making use of a cover glass and a slide glass each of which has variations in the thickness direction. Thus, if a sample serving as an object of illumination is located at a certain position in an operation to radiate illumination light to the sample, the optical distance between the object of illumination and an object lens undesirably varies because the thickness of the slide glass varies. As a result, an illumination field diaphragm provided in an illumination optical system creates an image at a position separated from the observation position of the sample surface in the direction of the optical axis, raising problems including an issue that the contrast of the image deteriorates.

In the existing microscopes including the one disclosed in Patent Document 1, focus adjustment is generally carried out as follows. A field-diaphragm correction ring is squeezed, the optical-axis direction position of the condenser lens employed in the illumination optical system is adjusted and the image creation state on the edges of the field-diaphragm correction ring is observed visually or observed at an image taking device and adjusted.

In order to construct a system capable of automatically observing a plurality of samples, however, it is necessary to automatically provide the system with a capability of carrying out the focus adjustment for the illumination field diaphragm automatically and at a high speed.

There is a need for the present application addressing the above problems to provide a microscope and a focusing method capable of carrying out the focus adjustment for the illumination field diaphragm automatically.

In order to solve the problems described above, there is provided a microscope according to an embodiment. The microscope employs: an illumination optical system provided with an illumination field diaphragm, and one or a plurality of illumination optical devices to serve as an optical system configured to radiate illumination light to a sample placed on a stage; a first image creation optical system provided with a first image taking device configured to take an image based on transmitted light passing through the sample, and one or a plurality of first optical devices configured to create the image based on the transmitted light on the first image taking device; a second image creation optical system provided with a light-beam splitting section configured to split the transmitted light propagating in the first image creation optical system in order to get a partial light beam from the transmitted light, a second image taking device configured to take a phase-difference image based on the partial light beam, and one or a plurality of second optical devices configured to create the phase-difference image based on the partial light beam on the second image taking device; an illumination-field-diaphragm focus adjustment section configured to adjust an image creation position at which an image of the illumination field diaphragm is created; and a characteristic-quantity computation block configured to compute a characteristic quantity, which represents a focus shift degree of the illumination field diaphragm, on the basis of an output signal generated by the second image taking device. The illumination-field-diaphragm focus adjustment section adjusts the image creation position for the illumination field diaphragm on the basis of the characteristic quantity computed by the characteristic-quantity computation block.

The phase-difference image includes first and second images created on the second image taking device in accordance with the shape of the illumination field diaphragm. The characteristic-quantity computation block may compute the characteristic quantity by making use of a difference in intensity between an output signal of the first image and an output signal of the second image at every pixel on the second image taking device.

It is desirable for the characteristic-quantity computation block to compute the characteristic quantity in a state in which the transmitted light passing through the sample is not focused on the first image taking device.

It is desirable to adjust the intensity of the illumination light so as to put the intensity of an output signal of the phase-difference image created on the second image taking device in a saturated state.

It is possible to configure the microscope into a configuration in which: the microscope is further employed a position control section configured to control the position of the stage; and a thickness-change computation block configured to compute a change of the thickness of a slide glass on which the sample is mounted. The phase-difference image includes first and second images created on the second image taking device in accordance with the shape of the illumination field diaphragm. The thickness-change computation block computes a change of the thickness by making use of a difference in intensity between an output signal of the first image and an output signal of the second image at every pixel on the second image taking device. The position control section changes the position of the stage toward the illumination optical system on the basis of the thickness change computed by the thickness-change computation block.

It is possible to configure the microscope into a configuration in which: the microscope is further employed a position control section configured to control the position of the stage; and a thickness-change computation block configured to compute a change of the thickness of a slide glass on which the sample is mounted. The phase-difference image includes first and second images created on the second image taking device in accordance with the shape of the illumination field diaphragm. The thickness-change computation block computes a change of the thickness by making use of a difference in edge position between the first image taken in an in-focus state and the first image taken in an actual state and/or a difference in edge position between the second image taken in an in-focus state and the second image taken in an actual state.

The position control section changes the position of the stage toward the illumination optical system on the basis of the thickness change computed by the thickness-change computation block.

The thickness-change computation block may compute a change of the thickness on the basis of an edge position on a side, on which the shape of the illumination field diaphragm exists in the first or second image, for the first or second image.

The thickness-change computation block may compute a change of the thickness on the basis of an edge position on a side, on which the shape of the illumination field diaphragm exists in each of the first and second images, for each of the first and second images.

The thickness-change computation block may compute a change of the thickness on the basis of a sum of edge positions on both sides, on which the shape of the illumination field diaphragm exists in each of the first and second images, for each of the first and second images.

The characteristic-quantity computation block may compute the characteristic quantity by making use of the edge position of the output signal.

It is possible to configure the microscope into a configuration in which: the microscope is further employed a brightness correction block configured to correct the brightness of an image created on the first image taking device. The brightness correction block makes use of a brightness correction pattern, which has been prepared in advance as a pattern to be used in brightness correction, in order to correct the brightness of the image created on the first image taking device after the illumination-field-diaphragm focus adjustment section has adjusted the image creation position for the illumination field-diaphragm in order to put the image of the illumination field diaphragm in an in-focus state.

It is possible to configure the microscope into a configuration in which: the microscope is further employed a brightness correction block configured to correct the brightness of an image created on the first image taking device. The brightness correction block selects one of a plurality of brightness correction patterns, which have each been prepared in advance as a pattern to be used in brightness correction, on the basis of the computed changes of the thickness of the slide glass and makes use of the selected brightness correction pattern in order to correct the brightness of the image.

In order to solve the problems described above, there is provided a focusing method according to another embodiment. The focusing method includes: splitting transmitted light, which is part of illumination light radiated in an illumination optical system having an illumination field diaphragm and has passed through a sample put on a stage, in order to get a partial light beam from the transmitted light and letting an image taking device take a phase-difference image based on the partial light beam; computing a characteristic quantity, which represents the focus shift degree of the illumination field diaphragm, on the basis of an output signal generated by the image taking device; and driving an illumination-field-diaphragm focus adjustment mechanism to adjust an image creation position, at which an image of the illumination field diaphragm is created, on the basis of the computed characteristic quantity.

In accordance with the present application, the focus adjustment for the illumination field diaphragm can be carried out automatically.

Additional features and advantages are described herein, and will be apparent from the following Detailed Description and the figures.

BRIEF DESCRIPTION OF THE FIGURES

FIG. 3 is an explanatory diagram roughly showing optical systems employed in the microscope according to the same embodiment;

FIG. 4 is another explanatory diagram roughly showing optical systems employed in the microscope according to the same embodiment;

DETAILED DESCRIPTION

Embodiments of the present application will be described below in detail with reference to the drawings.

It is to be noted that, in this specification of the present application and the diagrams, configuration elements having virtually identical functional configurations are denoted by the same reference symbol and the configuration elements denoted by the same reference symbol are explained only once in order to eliminate duplications of descriptions.

It is also worth noting that the embodiments are explained in chapters arranged in the following order.

Figure 1:
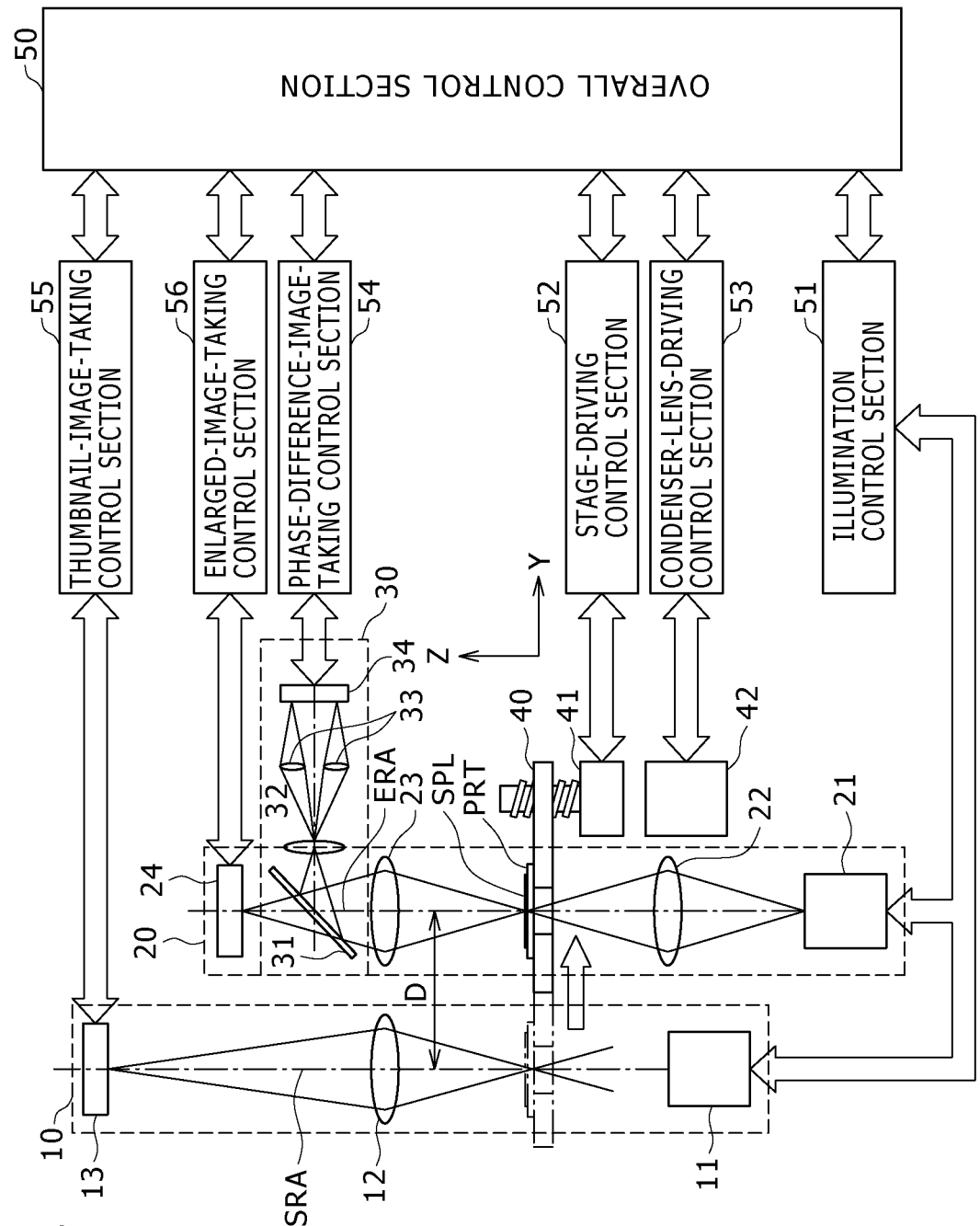
FIG. 1 is an explanatory diagram showing the configuration of a microscope according to a first embodiment.

(1) First Embodiment
  (1-1) Configuration of the Microscope
  (1-2) Focus Adjustment Processing for the Illumination Field Diaphragm
  (1-3) Processing to Adjust the Position of the Stage (1-4) Processing to Correct Brightness Unevenness
(1-5) Typical Modifications First Embodiment Configuration of the Microscope First of all, the configuration of a microscope 1 according to a first embodiment is explained by referring to FIG. 1. FIG. 1 is an explanatory diagram showing the configuration of the microscope 1 according to the first embodiment.

Overall Configuration

As typically shown in FIG. 1, the microscope 1 according to the first embodiment employs a thumbnail-image creation section 10 and an enlarged-image creation section 20. The thumbnail-image creation section 10 takes an image of an entire prepared slide PRT on which a biological sample SPL is placed. In the following description, an image of the entire prepared slide PRT is referred to as a thumbnail image. The enlarged-image creation section 20 takes an image of a biological sample SPL by enlarging the image by a magnifying power determined in advance. In the following description, the image enlarged by the magnifying power is referred to simply as an enlarged image. In addition, the enlarged-image creation section 20 is provided with a defocus-quantity detection section 30 for detecting the defocus quantity of an illumination field diaphragm existing in the enlarged-image creation section 20.

The prepared slide PRT is a biological sample SPL fixed on a slide glass by adoption of a fixing technique determined in advance. The biological sample SPL can be a tissue segment or a smear cell. The tissue can be a junction tissue of blood or the like, an epithelia tissue or both the junction tissue and the epithelia tissue. If necessary, any one of various kinds of staining is applied to the tissue segment or the smear cell. The various kinds of staining include the ordinary staining and the fluorescent staining. Representative examples of the ordinary staining are the HE (Hematoxylin-Eosin) staining, the Giemsa staining and the Papanicolaou staining. Typical examples of the fluorescent staining are the FISH (Fluorescence In-Situ Hybridization) method and the oxygen antibody method.

In addition, a label is pasted on the prepared slide PRT. The label shows peculiar information used to identify the biological sample SPL of the prepared slide PRT. The peculiar information includes the name of a person preparing the sample, a sample taking time and a sample taking date as well as the type of staining.

The microscope 1 according to this embodiment is also provided with a stage 40 on which a prepared slide PRT like the one described above is mounted. In addition, the microscope 1 is also provided with a stage driving mechanism 41 for moving the stage 40 in a variety of directions. To be more specific, the stage driving mechanism 41 is capable of moving the stage 40 in directions parallel to the surface of the stage 40 and a direction perpendicular to the surface with a high degree of freedom. The directions parallel to the surface of the stage 40 are referred to as X-axis and Y-axis directions whereas the direction perpendicular to the surface is referred to as a Z-axis direction.

In addition, the enlarged-image creation section 20 is provided with a condenser-lens driving mechanism 42 which is a typical illumination-field-diaphragm focus adjustment section.

Thumbnail-Image Taking Section

As shown in FIG. 1, the thumbnail-image creation section 10 is provided with main components such as an optical source 11, an object lens 12 and an image taking device 13.

The optical source 11 is provided on a side opposite to the prepared slide PRT with respect to the stage 40. The optical source 11 is capable of radiating bright-field illumination light or dark-field illumination light and switching from one light to the other. The bright-field illumination light is light for illuminating the biological sample SPL already subjected to the ordinary staining. The bright-field illumination light is also referred to simply as field illumination light. On the other hand, the dark-field illumination light is light for illuminating the biological sample SPL already subjected to special staining. In addition, the optical source 11 can also be an optical source capable of radiating either bright-field illumination light or dark-field illumination light. In this case, two optical sources 11 are provided. One of the two optical sources 11 is capable of radiating bright-field illumination light whereas the other optical source 11 is capable of radiating dark-field illumination light.

On top of that, the thumbnail-image creation section 10 may also have a label optical source provided separately. The label optical source not shown in FIG. 1 radiates light used for taking an image of peculiar information written on the label pasted on the prepared slide PRT.

The object lens 12 having a magnifying power determined in advance takes a line, which is normal to the prepared-slide placing surface of the stage 40 and passes through the center of the thumbnail-image creation section 10, as an optical axis SRA. The object lens 12 is provided on the same side as the prepared slide PRT with respect to the stage 40. Transmitted light passing through the prepared slide PRT put on the prepared-slide placing surface of the stage 40 is converged by the object lens 12, creating an image on the image taking device 13 provided in the rear of the object lens 12. The statement saying "the image taking device 13 provided in the rear of the object lens 12" means that the image taking device 13 is provided at a location separated away from the object lens 12 in the direction in which the light propagates.

The light in an image taking range covering the entire prepared slide PRT put on the prepared-slide placing surface of the stage 40 creates an image on the image taking device 13. In other words, the transmitted light passing through the prepared slide PRT creates an image on the image taking device 13. The image created on the image taking device 13 is a thumbnail image which is a microscope image obtained as a result of an operation to take an image of the entire prepared slide PRT.

Enlarged-Image Taking Section

As shown in FIG. 1, the enlarged-image creation section 20 is provided with main components including an optical source 21, a condenser lens 22, an object lens 23 and an image taking device 24. In addition, the enlarged-image creation section 20 is also provided with an illumination field diaphragm not shown in the figure.

The optical source 21 radiates bright-field illumination light. The optical source 21 is provided on a side opposite to the prepared slide PRT with respect to the stage 40. In addition, another optical source for generating dark-field illumination light is provided also on the side opposite to the prepared slide PRT with respect to the stage 40 but at a location different from the optical source 21. The other optical source is not shown in FIG. 1.

The condenser lens 22 is a lens for converging bright-field illumination light radiated by the optical source 21 as well as dark-field illumination light radiated by the other optical source for generating the dark-field illumination light and guiding the converged bright-field illumination light as well as the converged dark-field illumination light to the prepared slide PRT placed on the stage 40. The condenser lens 22 takes a line, which is normal to the prepared-slide placing surface of the stage 40 and passes through the center of the enlarged-image creation section 20, as an optical axis ERA. The condenser lens 22 is provided between the optical source 21 and the stage 40. The condenser-lens driving mechanism 42 is capable of driving the condenser lens 22 to move in the direction of the optical axis ERA. That is to say, the condenser-lens driving mechanism 42 is capable of changing the position of the condenser lens 22 on the optical axis ERA.

The object lens 23 having a magnifying power determined in advance takes a line, which is normal to the prepared-slide placing surface of the stage 40 and passes through the center of the enlarged-image creation section 20, as the optical axis ERA. The object lens 23 is provided on the same side as the prepared slide PRT with respect to the stage 40. By properly replacing the object lens 23 used in the enlarged-image creation section 20, the image of the biological sample SPL can be enlarged at a variety of magnifying powers and taken. Transmitted light passing through the prepared slide PRT put on the prepared-slide placing surface of the stage 40 is converged by the object lens 23, creating an image on the image taking device 24 provided in the rear of the object lens 23. The statement saying "the image taking device 24 provided in the rear of the object lens 23" means that the image taking device 24 is provided at a location separated away from the object lens 23 in the direction in which the light propagates.

It is to be noted that, on the optical axis ERA between the object lens 23 and the image taking device 24, a beam splitter 31 is provided. Part of transmitted light passing through the object lens 23 is guided by the beam splitter 31 to the inside of the defocus-quantity detection section 30 including the beam splitter 31 as described later.

In accordance with the pixel size of the image taking device 24 and the magnifying power of the object lens 23, an image in an image taking range on the prepared-slide placing surface of the stage 40 is created on the image taking device 24. The image taking range has a width determined in advance and a height also determined in advance. It is to be noted that, since the object lens 23 enlarges a portion of the biological sample SPL, the image taking range is sufficiently small in comparison with the image taking range on the image taking device 13.

In the configuration shown in FIG. 1, the normal line passing through the center position of the thumbnail-image creation section 10 to serve as the optical axis SRA is separated away in the Y-axis direction from the normal line passing through the center position of the enlarged-image creation section 20 to serve as the optical axis ERA by a distance D. The distance D is set at such a value which is large enough that a lens barrel (not shown) for holding the object lens 23 of the enlarged-image creation section 20 is not projected on the image taking range of the image taking device 13. However, the distance D is small enough so that the size of the microscope 1 can be reduced.

Defocus-Quantity Detection Section

As shown in FIG. 1, the defocus-quantity detection section 30 employs main components including the beam splitter 31, a condenser lens 32, two eye lenses 33 and an image taking device 34.

As explained earlier, the beam splitter 31 is provided on the optical axis ERA between the object lens 23 and image taking device 24 which are employed in the enlarged-image creation section 20 and part of transmitted light passing through the object lens 23 is guided by the beam splitter 31 to the inside of the defocus-quantity detection section 30 including the beam splitter 31. In other words, the beam splitter 31 splits the transmitted light passing through the object lens 23 into transmitted light propagating to the image taking device 24 and reflected light propagating to the condenser lens 32 employed in the defocus-quantity detection section 30 to be described later.

That is to say, the condenser lens 32 is provided at a location separated away from the beam splitter 31 in the direction of the propagation of the reflected light obtained as the splitting carried out by the beam splitter 31. The condenser lens 32 converges the reflected light obtained as the splitting carried out by the beam splitter 31 into a light beam and directs the light beam to the two eye lenses 33 provided at locations separated away from the beam splitter 31 in the toward-rear direction which is defined as the direction of the propagation of the reflected light.

The two eye lenses 33 divide the light beam coming from the condenser lens 32 into two light beams. The two light beams create a set of observation-object images on the image creation surface of the image taking device 34 provided at a location separated away from the two eye lenses 33 in the toward-rear direction which is defined as the direction of the propagation of the reflected light.

That is to say, the light passing through each of the two eye lenses 33 creates an image on the image creation surface of the image taking device 34. As a result, a pair of observation-object images are created on the image creation surface of the image taking device 34. Since light beams passing through the condenser lens 32 in a variety of directions hit the two eye lenses 33, there is a difference in phase between the observation-object images created on the image creation surface of the image taking device 34. In the following description, the pair of observation-object images are referred to as phase-difference images. The defocus-quantity detection section 30 according to this embodiment detects the defocus quantity of the illumination field diaphragm existing in the enlarged-image creation section 20 by making use of this difference in phase.

The above description explains a configuration in which the beam splitter 31 is placed between the object lens 23 and the image taking device 24. However, a light-beam splitting portion for splitting a light beam does not have to be the beam splitter 31. For example, a movable mirror can also be used as the light-beam splitting portion.

In addition, the image taking device employed in each of the thumbnail-image creation section 10, the enlarged-image creation section 20 and the defocus-quantity detection section 30 can be a one-dimensional image taking device or a two-dimensional image taking device.

It is to be noted that the enlarged-image creation section 20 and the defocus-quantity detection section 30 are explained again in detail as follows.

Control Sections

As shown in FIG. 1, the microscope 1 according to this embodiment employs a variety of control sections for controlling a variety of members included in the microscope 1. To put it concretely, the microscope 1 according to this embodiment employs an illumination control section 51 for controlling a variety of optical sources included in the microscope 1. The optical sources include the optical source 11 and the optical source 21. The microscope 1 also employs a stage-driving control section 52 for controlling the stage driving mechanism 41 and a condenser-lens-driving control section 53 for controlling the position of the condenser lens 22. The microscope 1 also employs a phase-difference-image-taking control section 54 for controlling the image taking device 34 used for taking the phase-difference images and a thumbnail-image-taking control section 55 for controlling the image taking device 13 used for taking the thumbnail image. The microscope 1 also employs an enlarged-image-taking control section 56 for controlling the image taking device 24 used for taking an enlarged image of the biological sample SPL. The illumination control section 51, the stage-driving control section 52, the condenser-lens-driving control section 53, the phase-difference-image-taking control section 54, the thumbnail-image-taking control section 55 and the enlarged-image-taking control section 56 are connected to the optical source 11/the optical source 21, the stage driving mechanism 41, the condenser-lens driving mechanism 42, the image taking device 34, the image taking device 13 and the image taking device 24 respectively by a variety of data communication lines.

In addition, the microscope 1 according to this embodiment employs an overall control section 50 provided separately for controlling the microscope 1 as a whole. The overall control section 50 is connected to the illumination control section 51, the stage-driving control section 52, the condenser-lens-driving control section 53, the phase-difference-image-taking control section 54, the thumbnail-image-taking control section 55 and the enlarged-image-taking control section 56 by a variety of data communication lines.

Each of the overall control section 50, the illumination control section 51, the stage-driving control section 52, the condenser-lens-driving control section 53, the phase-difference-image-taking control section 54, the thumbnail-image-taking control section 55 and the enlarged-image-taking control section 56 employs a CPU (Central Processing Unit), a ROM (Read Only Memory), a RAM (Random Access Memory), a storage unit, a communication unit and a processing circuit.

The above mentioned sections and their functions are explained as follows.

Illumination Control Section

The illumination control section 51 is a processing section for controlling a variety of optical sources employed in the microscope 1 according to this embodiment. When the illumination control section 51 receives information indicating a method for illuminating the biological sample SPL from the overall control section 50, on the basis of the information indicating the method, the illumination control section 51 controls the illumination of an optical source indicated by the information.

For example, the following description is focused on execution of control of the optical source 11 employed in the thumbnail-image creation section 10. In this case, the illumination control section 51 refers to the information indicating a method for illuminating the biological sample SPL in order to determine whether a bright field mode or a dark field mode is to be implemented. The bright field mode is a mode for acquiring a bright field image whereas the dark field mode is a mode for acquiring a dark field image. Then, the illumination control section 51 sets parameters according to the mode to be implemented for the optical source 11 so that the optical source 11 radiates illumination light according to the mode. Thus, the illumination light radiated by the optical source 11 propagates through an aperture on the stage 40 and arrives at the entire biological sample SPL. It is to be noted that the parameters set by the illumination control section 51 typically include the intensity of the illumination light and a parameter indicating the type of the optical source.

Next, the following description is focused on execution of control of the optical source 21 employed in the enlarged-image creation section 20. In this case, the illumination control section 51 refers to the information indicating a method for illuminating the biological sample SPL in order to determine whether a bright field mode or a dark field mode is to be carried out. Then, the illumination control section 51 sets parameters according to the mode to be implemented for the optical source 21 so that the optical source 21 radiates illumination light according to the mode. Thus, the illumination light radiated by the optical source 21 propagates through the aperture on the stage 40 and arrives at the entire biological sample SPL. It is to be noted that the parameters set by the illumination control section 51 typically include the intensity of the illumination light and a parameter indicating the type of the optical source.

The reader is advised to keep in mind that it is desirable to radiate visible light in the bright field mode as illumination light. On top of that, it is also desirable to take a marker generating light having wavelengths including an excitable wavelength as a fluorescent marker used in the special staining. In addition, in the dark field mode, the background position for the fluorescent marker is cut out.

Stage-Driving Control Section

The stage-driving control section 52 is a processing section for controlling the stage driving mechanism 41 for driving the stage 40 provided in the microscope 1 according to this embodiment. When the stage-driving control section 52 receives information indicating a method for taking an image of the biological sample SPL from the overall control section 50, on the basis of the received information indicating the method, the stage-driving control section 52 controls the stage driving mechanism 41.

For example, the following description is focused on an operation to take a thumbnail image. In this case, when the stage-driving control section 52 receives information serving as a command to take a thumbnail image of the biological sample SPL from the overall control section 50, on the basis of the received information serving as a command, the stage-driving control section 52 controls the stage driving mechanism 41 to move the stage 40 in the stage surface directions (also referred to as the X-Y axis directions) so that the entire prepared slide PRT is put in an image taking range of the image taking device 13. In addition, the stage-driving control section 52 also controls the stage driving mechanism 41 to move the stage 40 in the Z-axis direction so that the entire prepared slide PRT coincides with the focus of the object lens 12.

Next, the following description is focused on an operation carried out by the microscope 1 according to this embodiment to take an enlarged image of the biological sample SPL. In this case, when the stage-driving control section 52 receives information serving as a command to take an enlarged image of the biological sample SPL from the overall control section 50, on the basis of the received information serving as a command, the stage-driving control section 52 controls and drives the stage driving mechanism 41 to move the stage 40 in the stage surface directions (also referred to as the X-Y axis directions) so that the biological sample SPL is moved from a position between the optical source 11 and the object lens 12 to a position between the condenser lens 22 and the object lens 23.

In addition, the stage-driving control section 52 also controls and drives the stage driving mechanism 41 to move the stage 40 in the stage surface directions (also referred to as the X-Y axis directions) so that a predetermined member of the biological sample SPL is put in the image taking range of the image taking device 24.

On top of that, the stage-driving control section 52 also controls and drives the stage driving mechanism 41 to move the stage 40 in a direction perpendicular to the stage surface directions so that the predetermined member of the biological sample SPL coincides with the focus of the object lens 23. As described above, the predetermined member of the biological sample SPL has been put in the image taking range of the image taking device 24. By the way, the direction perpendicular to the stage surface directions is also referred to as the Z-axis direction or the depth direction of the tissue segment.

Condenser-Lens-Driving Control Section

The condenser-lens-driving control section 53 is a processing section for controlling the condenser-lens driving mechanism 42 for driving the condenser lens 22 employed in the enlarged-image creation section 20 in the microscope 1 according to this embodiment. When the condenser-lens-driving control section 53 receives information on a defocus quantity of the illumination field diaphragm employed in the enlarged-image creation section 20 from the overall control section 50, on the basis of the received information on a defocus quantity, the condenser-lens-driving control section 53 controls the condenser-lens driving mechanism 42.

As will be described later, if the illumination field diaphragm employed in the enlarged-image creation section 20 does not properly coincide with the focus of the condenser lens 22, the contrast of the enlarged image created on the image taking device 24 undesirably deteriorates. In order to prevent the contrast of the enlarged image from deteriorating, the overall control section 50 employed in the microscope 1 according to this embodiment carries out special processing on the defocus quantity of the illumination field diaphragm on the basis of the phase-difference images generated by the defocus-quantity detection section 30. The overall control section 50 itself will be described later in detail. The overall control section 50 outputs information representing the specially processed defocus quantity of the illumination field diaphragm to the condenser-lens-driving control section 53 in order to control the condenser-lens-driving control section 53 to change the position of the condenser lens 22 so that the focus of the condenser lens 22 is put in a state of coinciding with the illumination field diaphragm employed in the enlarged-image creation section 20.

To put it in detail, in accordance with the control executed by the overall control section 50, the condenser-lens-driving control section 53 drives the condenser-lens driving mechanism 42 to correct the position of the condenser lens 22 on the optical axis ERA so that the focus of the condenser lens 22 coincides with the illumination field diaphragm employed in the enlarged-image creation section 20.

Phase-Difference-Image-Taking Control Section

The phase-difference-image-taking control section 54 is a processing section for controlling the image taking device 34 employed in the defocus-quantity detection section 30. The phase-difference-image-taking control section 54 sets parameters according to the bright field mode or the dark field mode in the image taking device 34. In addition, when the phase-difference-image-taking control section 54 receives an output signal generated by the image taking device 34 as a signal representing images created on the image creation surface of the image taking device 34, the phase-difference-image-taking control section 54 takes the output signal as a signal representing phase-difference images. When the phase-difference-image-taking control section 54 receives the output signal representing phase-difference images, the phase-difference-image-taking control section 54 supplies data representing the output signal to the overall control section 50. It is to be noted that the parameters set by the phase-difference-image-taking control section 54 in the image taking device 34 typically include an exposure start timing and an exposure end timing. That is to say, the parameters set by the phase-difference-image-taking control section 54 in the image taking device 34 typically include an exposure time.

Thumbnail-Image-Taking Control Section

The thumbnail-image-taking control section 55 is a processing section for controlling the image taking device 13 employed in the thumbnail-image creation section 10. The thumbnail-image-taking control section 55 sets parameters according to the bright field mode or the dark field mode in the image taking device 13. In addition, when the thumbnail-image-taking control section 55 receives an output signal generated by the image taking device 13 as a signal representing an image created on the image creation surface of the image taking device 13, the thumbnail-image-taking control section 55 takes the output signal as a signal representing a thumbnail image. When the thumbnail-image-taking control section 55 receives the output signal representing thumbnail image, the thumbnail-image-taking control section 55 supplies data representing the output signal to the overall control section 50. It is to be noted that the parameters set by the thumbnail-image-taking control section 55 in the image taking device 13 typically include an exposure start timing and an exposure end timing.

Enlarged-Image-Taking Control Section

The enlarged-image-taking control section 56 is a processing section for controlling the image taking device 24 employed in the enlarged-image creation section 20. The enlarged-image-taking control section 56 sets parameters according to the bright field mode or the dark field mode in the image taking device 24. In addition, when the enlarged-image-taking control section 56 receives an output signal generated by the image taking device 24 as a signal representing an image created on the image creation surface of the image taking device 24, the enlarged-image-taking control section 56 takes the output signal as a signal representing an enlarged image. When the enlarged-image-taking control section 56 receives the output signal representing enlarged image, the enlarged-image-taking control section 56 supplies data representing the output signal to the overall control section 50. It is to be noted that the parameters set by the enlarged-image-taking control section 56 in the image taking device 24 typically include an exposure start timing and an exposure end timing.

Overall Control Section

Figure 2:
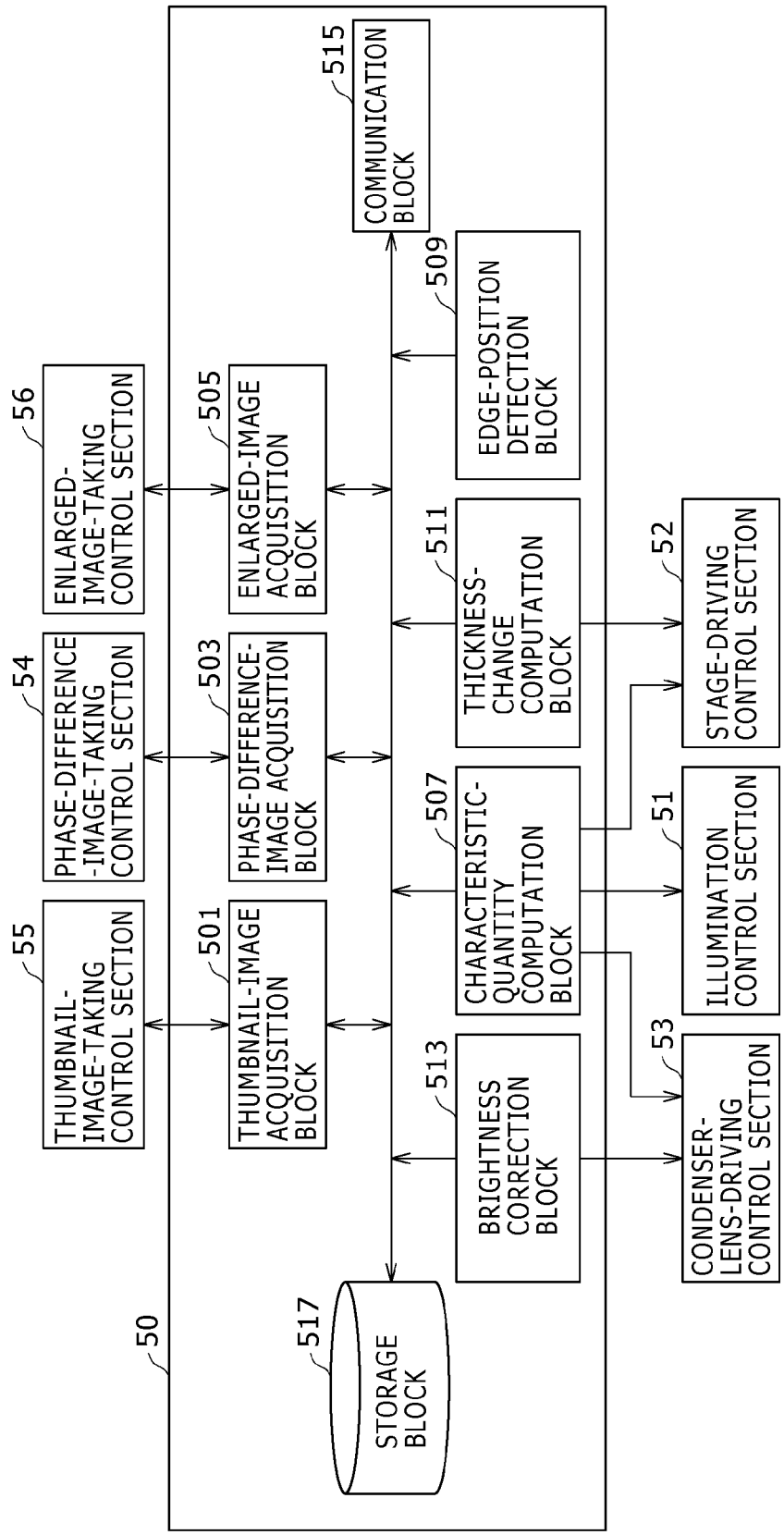
FIG. 2 is a block diagram showing the configuration of an overall control section according to the same embodiment.

The overall control section 50 is a processing section for controlling the entire microscope including the illumination control section 51 to the enlarged-image-taking control section 56 described above. The configuration of the overall control section 50 according to this embodiment is explained in detail by referring to FIG. 2 as follows. FIG. 2 is a block diagram showing the configuration of the overall control section 50 according to this embodiment.

As shown in FIG. 2, the overall control section 50 employs a thumbnail-image acquisition block 501, a phase-difference-image acquisition block 503, an enlarged-image acquisition block 505, a characteristic-quantity computation block 507, an edge-position detection block 509, a thickness-change computation block 511, a brightness correction block 513, a communication block 515 and a storage block 517.

The thumbnail-image acquisition block 501 is typically implemented by components including a CPU, a ROM, a RAM and a communication unit. When the user operates an operation determined in advance on the microscope 1, when a prepared slide PRT is mounted on the stage 40 or in the event of another operation, the thumbnail-image acquisition block 501 requests the thumbnail-image-taking control section 55 to set a variety of parameters in the image taking device 13 and take a thumbnail image.

Then, the thumbnail-image acquisition block 501 acquires data of the thumbnail image from the thumbnail-image-taking control section 55. In the following description, the data of a thumbnail image is also referred to as thumbnail-image data. The thumbnail-image acquisition block 501 may store the thumbnail-image data in the storage block 517 to be described later. In addition, the thumbnail-image acquisition block 501 may also output the thumbnail-image data to typically an image-data storage server, which is provided externally to the overall control section 50, by way of the communication block 515.

The phase-difference-image acquisition block 503 is also typically implemented by components including a CPU, a ROM, a RAM and a communication unit. With a timing determined in advance, the phase-difference-image acquisition block 503 requests the phase-difference-image-taking control section 54 to set a variety of parameters in the image taking device 34 and take phase-difference images. In this case, the timing to make a request for an operation to take the phase-difference images is typically a time at which the user carries out an operation to make a request for focus adjustment for the illumination field diaphragm, a time after a predetermined period of time has lapsed since the execution of the focus adjustment for the illumination field diaphragm, the start time of an operation to take an enlarged image or another timing set in advance.

Then, the phase-difference-image acquisition block 503 acquires data of the phase-difference images from the phase-difference-image-taking control section 54. In the following description, the data of phase-difference images is also referred to as phase-difference-image data. The phase-difference-image acquisition block 503 outputs the phase-difference-image data to the characteristic-quantity computation block 507 to be described later. The phase-difference-image acquisition block 503 may also store the phase-difference-image data in the storage block 517 to be described later.

The enlarged-image acquisition block 505 is typically implemented by components including a CPU, a ROM, a RAM and a communication unit. When the user operates an operation determined in advance on the microscope 1, when an operation to take a thumbnail image of a prepared slide PRT is finished or in the event of another operation, the enlarged-image acquisition block 505 requests the enlarged-image-taking control section 56 to set a variety of parameters in the image taking device 24 and take an enlarged image.

Then, the enlarged-image acquisition block 505 acquires data of the enlarged image from the enlarged-image-taking control section 56. In the following description, the data of an enlarged image is also referred to as enlarged-image data. The enlarged-image acquisition block 505 may store the enlarged-image data in the storage block 517 to be described later. In addition, the enlarged-image acquisition block 505 may also output the enlarged-image data to typically an image-data storage server, which is provided externally to the overall control section 50, by way of the communication block 515.

The characteristic-quantity computation block 507 is typically implemented by components including a CPU, a ROM and a RAM. On the basis of the phase-difference-image data acquired by the phase-difference-image acquisition block 503, the characteristic-quantity computation block 507 computes a characteristic quantity representing a focus shift degree of the illumination field diaphragm provided in the enlarged-image creation section 20. The characteristic quantity computed by the characteristic-quantity computation block 507 and a method for computing the characteristic quantity will be described again later in detail. The characteristic-quantity computation block 507 outputs the computed characteristic quantity representing a focus shift degree of the illumination field diaphragm to the condenser-lens-driving control section 53. Then, the condenser-lens-driving control section 53 drives the condenser-lens driving mechanism 42 to move the condenser lens 22 in accordance with the characteristic quantity received from the characteristic-quantity computation block 507 in order to eliminate focus blurring of the illumination field diaphragm.

It is to be noted that, while the characteristic-quantity computation block 507 is computing a characteristic quantity representing a focus shift degree of the illumination field diaphragm, the characteristic-quantity computation block 507 is also capable of carrying out other operations. For example, the characteristic-quantity computation block 507 is capable of issuing a request regarding the light quantity of illumination light to the illumination control section 51 and issuing a request regarding the in-focus degree of the biological sample SPL to the stage-driving control section 52.

In addition, as will be described later, there are a variety of methods each adopted for computing the characteristic quantity. The characteristic-quantity computation block 507 is also capable of computing the characteristic quantity in collaboration with the edge-position detection block 509 to be described later.

It is to be noted that the characteristic quantity computed by the characteristic-quantity computation block 507 and a variety of numerical values obtained in the course of the computation of the characteristic quantity are used in processing carried out by the thickness-change computation block 511 and processing carried out by the brightness correction block 513.

The edge-position detection block 509 is typically implemented by components including a CPU, a ROM and a RAM. In accordance with requests made by blocks such as the characteristic-quantity computation block 507 and the thickness-change computation block 511 to be described later as requests for detection of edge positions of the phase-difference images acquired by the phase-difference-image acquisition block 503, the edge-position detection block 509 detects the edge positions of the phase-difference images. A method adopted by the edge-position detection block 509 to detect an edge position of the phase-difference images is not specially limited to a particular method. That is to say, any commonly known method to detect an edge position of the phase-difference images can be adopted. Typical processing carried out by the edge-position detection block 509 according to this embodiment to detect an edge position of the phase-difference images will be described specially later in detail.

As will be described later, the phase-difference images in this embodiment is an image related to the shape of the illumination field diaphragm provided in the enlarged-image creation section 20. The edge-position detection block 509 carries out typically edge-position detection processing like one to be described later in order to detect an edge position in the shape of the illumination field diaphragm. The shape of the illumination field diaphragm is the shape of a field resulting from blocking carried out by the illumination field diaphragm. The edge position detected by the edge-position detection block 509 is typically expressed in terms of coordinates of pixels on the image taking device 34.

The edge-position detection block 509 supplies information on the detected edge position to the blocks making the requests for detection of edge positions of the phase-difference images. As described above, typical examples of the blocks are the characteristic-quantity computation block 507 and the thickness-change computation block 511.

The edge-position detection block 509 may detect an edge position by extracting only a one-dimensional image from a planar image also referred to as a two-dimensional image. As an alternative, the edge-position detection block 509 may also carry out processing to detect an edge position on the two-dimensional image itself.

The thickness-change computation block 511 is typically implemented by components including a CPU, a ROM and a RAM. As explained earlier, the prepared slide PRT is prepared by making use of a cover glass and a slide glass which each have thickness variations defined as variations in the thickness direction. Let these thickness variations of the cover glass and the slide glass be taken into consideration. In this case, the thickness variations of the slide glass have a greater effect on contrast variations of the resulting enlarged image than the effect of the thickness variations of the cover glass. The thickness-change computation block 511 computes the thickness variations of the slide glass, on which the biological sample SPL is mounted, by making use of the phase-difference-image data acquired by the phase-difference-image acquisition block 503.

It is to be noted that some data used in the computation of the thickness variations of the slide glass and some numerical values used in the same computation may be the same ones used by the characteristic-quantity computation block 507 in the computation of the characteristic quantity and/or the same ones obtained by the characteristic-quantity computation block 507 in the course of the computation of the characteristic quantity. For this reason, the thickness-change computation block 511 may efficiently compute the thickness variations of the slide glass in collaboration with the characteristic-quantity computation block 507.

A method adopted by the thickness-change computation block 511 to compute the thickness variations will be described specially later in detail.

The brightness correction block 513 is typically implemented by components including a CPU, a ROM and a RAM. The brightness correction block 513 corrects the brightness of an enlarged image output by the image taking device 24 employed in the enlarged-image creation section 20. When correcting the brightness, the brightness correction block 513 refers to a database stored in the storage block 517 to be described later to serve as a database associating thickness variations and brightness correction patterns with each other. On the basis of thickness variations computed by the thickness-change computation block 511, the brightness correction block 513 searches the database for a brightness correction pattern associated with the computed thickness variations. Then, the brightness correction block 513 makes use of the brightness correction pattern found and selected in the search operation in order to carry out processing to correct the brightness of the enlarged image.

On top of that, in addition to the method of making use of a brightness correction pattern, the brightness correction block 513 may also control the position of an optical device such as the condenser lens 22 to move the optical device to such a location at a stage following the optical source 21 that the focus of the condenser lens 22 coincides with the illumination field diaphragm. In this case, the brightness correction block 513 requests the condenser-lens-driving control section 53 to carry out processing to drive the condenser lens 22 and control the position of the condenser lens 22 so that the focus of the condenser lens 22 coincides with the illumination field diaphragm.

The communication block 515 is typically implemented by components including a CPU, a ROM, a RAM and a communication block. The communication block 515 controls communications carried out between the microscope 1 according to this embodiment and a variety of information processing apparatus provided externally to the microscope 1. To put it in detail, the communication block 515 controls communications carried out between the overall control section 50 employed in the microscope 1 and the external information processing apparatus. The communication block 515 allows the microscope 1 according to this embodiment to communicate in a duplex way with a variety of external information processing apparatus connected to a public network such as the Internet and a private network such as a local area network. A typical example of the external information processing apparatus is an image-data storage server used for storing microscope images of biological samples.

The storage block 517 is a typical storage block employed in the overall control section 50 according to this embodiment. The storage block 517 is used for storing various kinds of data such as a variety of design parameters of the microscope 1 according to this embodiment and a database of brightness correction patterns. In addition, the storage block 517 can also be used for storing image taking data and historical information. On top of that, the storage block 517 can also be used for properly storing a variety of parameters to be saved while the overall control section 50 according to this embodiment is carrying out some processing or data in the course of the processing and properly storing a variety of databases as well as a variety of programs.

Each of the blocks which are employed in the overall control section 50 is capable of writing data into the storage block 517 and reading out data from the storage block 517.

Typical functions of the overall control section 50 according to this embodiment have been described above. Each of the functional sections employed in the overall control section 50 can be configured to make use of general-purpose members and general-purpose circuits or hardware specially designed for the functions of the functional section. In addition, all the functions of each of the functional sections can also be carried out by a CPU and its peripheral components. Thus, the configuration of the overall control section 50 can be properly changed in accordance with any of a variety of technological levels for implementing the embodiment.

The reader is advised to keep in mind that it is possible to write computer programs for implementing the functions of the overall control section 50 and the functional sections employed in the overall control section 50. It is also possible to execute the programs on a personal computer or the like. In addition, it is also possible to present a recording medium which is used for storing such computer programs and allows a computer to read the programs. Typical examples of the recording medium are a magnetic disk, an optical disk, an opto-magnetic disk and a flash memory. In addition, the computer programs can also be downloaded from a program provider through a network instead of being stored in advance in a recording medium.

The entire configuration of the microscope 1 according to this embodiment has been explained above in detail by referring to FIGS. 1 and 2.

As described above, a phase-difference AF (Auto Focus) optical system in the defocus-quantity detection section 30 employs the condenser lens 32, the two eye lenses 33 and the image taking device 34. It is to be noted, however, that the phase-difference AF optical system is by no means limited to this typical configuration. For example, in place of the two eye lenses 33, one eye lens 33 is used in the edge detection and the detection of thickness changes of the slide glass. That is to say, the phase-difference AF optical system can have any other configuration as long as the other configuration provides the same functions as this typical configuration.

In addition, the transmission illumination optical system employed in the microscope 1 according to this embodiment can be a Kohler illumination optical system or another illumination optical system.

On top of that, in the configuration described above, the defocus-quantity detection section 30 is provided on the side of propagation of light reflected by the beam splitter 31. However, the defocus-quantity detection section 30 can also be provided on the side of propagation of light transmitted by the beam splitter 31.

Focus Adjustment Processing for the Illumination Field Diaphragm

Next, by referring to FIGS. 3 to 9, the following description explains details of focus adjustment processing carried out for the illumination field diaphragm.

Typical Configurations of the Enlarged-Image Taking Section and the Phase-Difference AF Optical System First of all, by referring to FIG. 3, the following description explains typical configurations of the enlarged-image creation section 20 and the defocus-quantity detection section 30. FIG. 3 is an explanatory diagram roughly showing optical systems employed in the microscope 1 according to this embodiment. To put it in detail, FIG. 3 roughly shows the optical systems of the enlarged-image creation section 20 and the defocus-quantity detection section 30.

As shown in FIG. 3, the enlarged-image creation section 20 according to this embodiment employs an illumination optical system at a stage preceding the stage 40 and an image creation optical system 211 at a stage succeeding the stage 40. As described earlier, the prepared slide PRT is placed on the stage 40. The illumination optical system radiates illumination light to the prepared slide PRT. The illumination optical system also has a transmission illumination front-stage optical system 201 provided at a stage preceding the illumination field diaphragm 205 and a transmission illumination rear-stage optical system 203 provided at a stage succeeding the illumination field diaphragm 205. In addition, the beam splitter 31 is provided inside the image creation optical system 211. A light beam obtained as a result of light splitting carried out by the beam splitter 31 propagates toward the defocus-quantity detection section 30. The defocus-quantity detection section 30 includes a phase-difference AF optical system 301.

It is to be noted that, in the following description, the magnifying power of the image creation optical system 211 serving as a first typical image creation optical system is denoted by reference symbol MI whereas the magnifying power of the phase-difference AF optical system 301 serving as a second typical image creation optical system is denoted by reference symbol MA.

A light beam radiated by the optical source 21 to serve as illumination light passes through the transmission illumination front-stage optical system 201 mechanically fixed on a fixing mechanism not shown in FIG. 3. Then, the light beam passing through the transmission illumination front-stage optical system 201 propagates to the illumination field diaphragm 205 included in the transmission illumination rear-stage optical system 203. Here, in order to consider the image creation of the edge of the illumination field diaphragm 205, a light beam A diffracted from the edge of the illumination field diaphragm 205 is taken into consideration. The edge of the illumination field diaphragm 205 is the edge of the shape of the illumination field diaphragm 205.

The light beam A passes through condenser lenses 207 and 209 employed in the transmission illumination rear-stage optical system 203, arriving at the surface of the biological sample SPL put on the surface of the slide glass A held on the stage 40 to serve as a slide glass having a refractive index n. The light beam A arriving at the surface of the biological sample SPL forms an image. Then, the light beam A arriving at the surface of the biological sample SPL propagates to the inside of the image creation optical system 211, passing through a condenser lens 213 serving as an object lens and a condenser lens 215. The light beam A passing through the condenser lens 215 creates an image on the image taking surface 217 of the image taking device 24 employed in the enlarged-image creation section 20. Thus, the user is capable of observing an image A created on the image taking device 24 as an image representing the images of both the illumination field diaphragm 205 and the surface of the biological sample SPL.

In addition, the beam splitter 31 provided inside the image creation optical system 211 reflects a portion of the light beam A. In the following description the technical term 'beam splitter' may be abbreviated simply to BS in some cases. In FIG. 3, the reflected portion of the light beam A is referred to as a light beam B. The light beam B enters the phase-difference AF optical system 301. After the light beam B has passed through a condenser lens 32 provided inside the phase-difference AF optical system 301, the light beam B propagates to the two eye lenses 33. The light beam B passing through the two eye lenses 33 then forms images on the image taking surface 305 of the image taking device 34 provided in the defocus-quantity detection section 30. The images formed on the image taking surface 305 are field diaphragm images B and C also referred to as phase-difference images. Thus, the user is capable of observing the field diaphragm images B and C as a set of phase-difference images.

The Case in Which Slide Glasses Having Different Thicknesses is Put

Figure 5A:
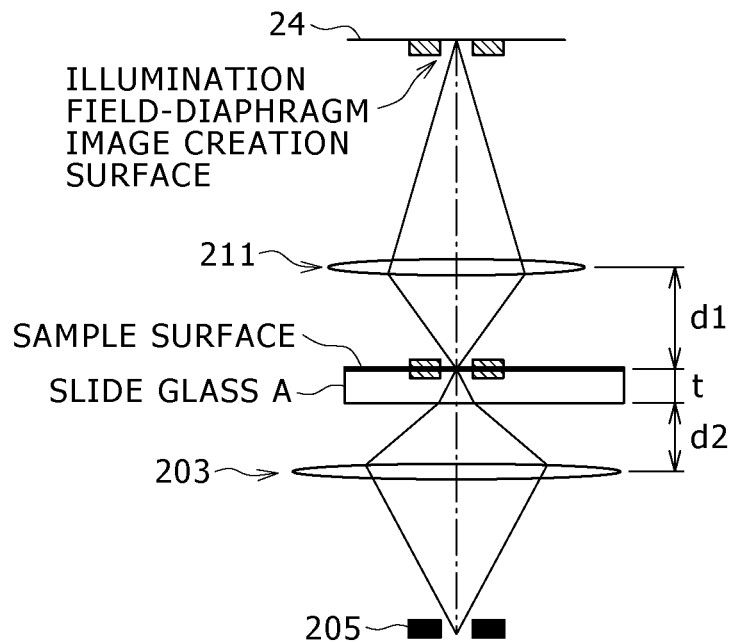
FIG. 5A is an explanatory diagram showing a relation between the thickness of a slide glass and the image creation position at which an image of an illumination field diaphragm is created.
Figure 5B:
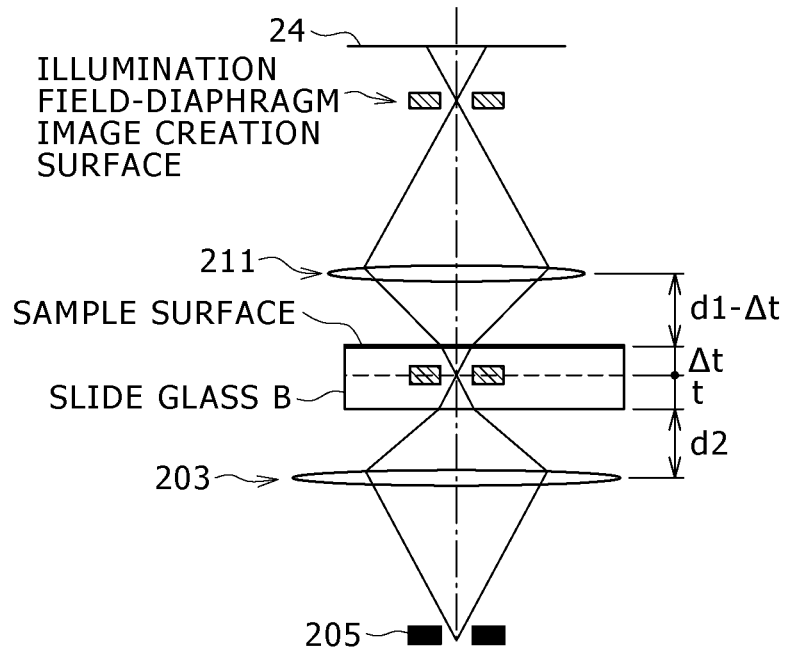
FIG. 5B is another explanatory diagram showing a relation between the thickness of a slide glass and the image creation position at which an image of an illumination field diaphragm is created.
Figure 6:
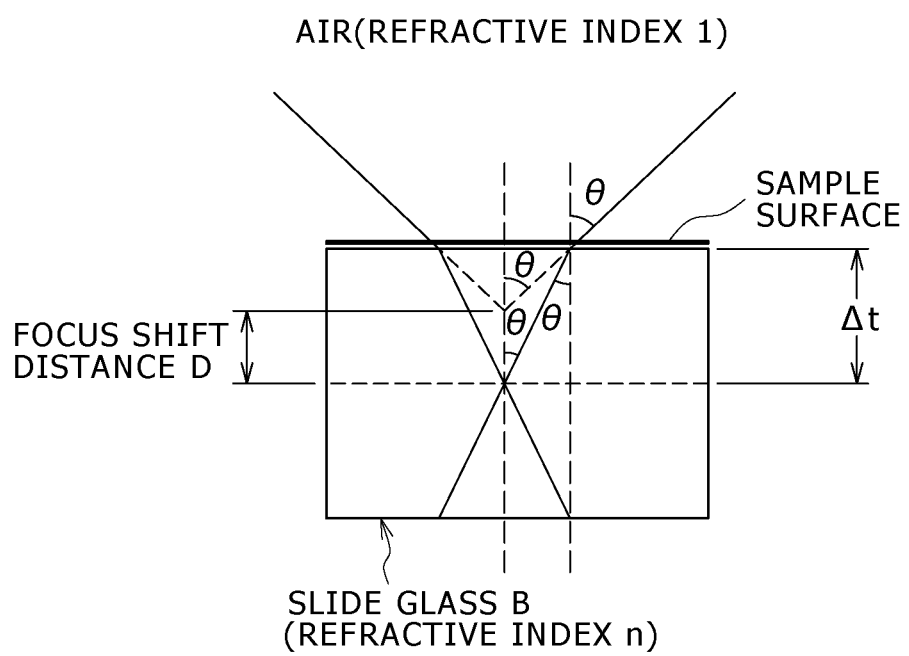
FIG. 6 is an explanatory diagram to be referred to in description of parameters used in formulation of a characteristic quantity showing the focus shift degree of an illumination field diaphragm.

Next, by referring to FIGS. 4 to 6, the following description explains a case in which a slide glass B having a refractive index n is put in the optical systems shown in FIG. 3. The slide glass B shown in FIG. 4 has a thickness different from the thickness of the slide glass A shown in FIG. 3 by a thickness difference $\Delta t$. FIG. 4 is an explanatory diagram roughly showing optical systems employed in the microscope according to this embodiment. FIGS. 5A and 5B are each an explanatory diagram showing a relation between the thickness of a slide glass and the image creation position at which the image of the illumination field diaphragm 205 is formed. FIG. 6 is an explanatory diagram referred to in the following description of parameters used in formulation of a characteristic quantity showing the focus shift degree of the illumination field diaphragm 205.

In the optical systems shown in FIG. 4, a light beam A' coming from the illumination field diaphragm 205 passes through the condenser lenses 207 and 209 provided in the transmission illumination rear-stage optical system 203, propagating to the slide glass B. If a case in which the stage 40 is set at the same position as that in FIG. 3 is taken into consideration, the image of the illumination field diaphragm 205 is created inside the slide glass B since the side glass B has a greater thickness than the slide glass A by a thickness difference $\Delta t$.

As shown in FIG. 5A, reference symbol d1 denotes the distance between the image creation optical system 211 and the surface of the biological sample SPL in the state shown in FIG. 3 whereas reference symbol d2 denotes the distance between the transmission illumination rear-stage optical system 203 and the slide glass A in the state shown in FIG. 3. Reference symbol t denotes the thickness of the slide glass A. If the thickness of the slide glass A is changed from t to (t+$\Delta t$)

in this state, the distance between the image creation optical system 211 and the surface of the biological sample SPL decreases to (d1−Δt) whereas the distance between the transmission illumination rear-stage optical system 203 and the slide glass A remains at d2. In the following description, the surface of the biological sample SPL is also referred to simply as a sample surface.

In the optical systems shown in each of FIGS. 3 and 5A, the space between the image creation optical system 211 and the surface of the biological sample SPL is filled up with air whereas the optical distance between the image creation optical system 211 and the slide glass A is expressed as follows:

(air refractive index=1)×(distance between the image creation optical system 211 and the sample surface)=d1

In the optical systems shown in each of FIGS. 4 and 5B, on the other hand, the space within the slide glass B is a space having the refractive index n and this space having the refractive index n is increased by the thickness difference Δt. Thus, the optical distance between the image creation optical system 211 and the slide glass B is expressed as follows:

1×(d1−Δt)+n×Δt=d1+(n−1)Δt

As is obvious from FIG. 6, in accordance with the Snell law, Equation 101 given below as an equation expressing sin (θ)=n×sin(θ') holds true. In addition, a geometrical relation shown in FIG. 6 indicates that Equation 102 given below as an equation expressing Δt×sin(θ')=(Δt−D)×sin(θ) holds true. In this equation, reference symbol D denotes the focal-point shift distance.

sin(θ)=n×sin(θ')  (Equation 101)

Δt×sin(θ')=(Δt−D)×sin(θ)  (Equation 102)

Thus, Equation 103 given below as an equation expressing the focal-point shift distance D can be derived from Equations 101 and 102 as follows:

$$D = \left(\frac{n-1}{n}\right) \cdot \Delta t \quad \text{(Equation 103)}$$

Accordingly, in the state shown in FIG. 5B, the focus is shifted from the image creation optical system 211 by the focal-point shift distance D. Therefore, the defocus quantity on the image taking surface 217 of the image taking device 24 is D×(MI)$^2$ where reference symbol MI denotes the magnifying power of the image creation optical system 211. As a result, the image of the illumination field diaphragm 205 on the image taking surface 217 is in an out-of-focus state also referred to as a defocus state.

In the microscope 1 according to this embodiment, information obtained from the phase-difference AF optical system 301 is used for detecting the defocus quantity of D×(MI)$^2$. In the following description, the defocus quantity is also referred to as a focus shift quantity.

[Principle of Detection of the Focus Shift Quantity]

The optical beam B' split by the beam splitter 31 from the optical beam A' enters the phase-difference AF optical system 301 in a defocus state represented by the defocus quantity of D×(MI)$^2$ in comparison with the light beam B. As shown in FIG. 3, the phase-difference AF optical system 301 employs the condenser lens 32 as well as the two eye lenses 33. In the phase-difference AF optical system 301, the defocus quantity is detected as a movement distance Δx in a planar direction on the image taking surface 305 as explained in detail in the following description.

Figure 7:
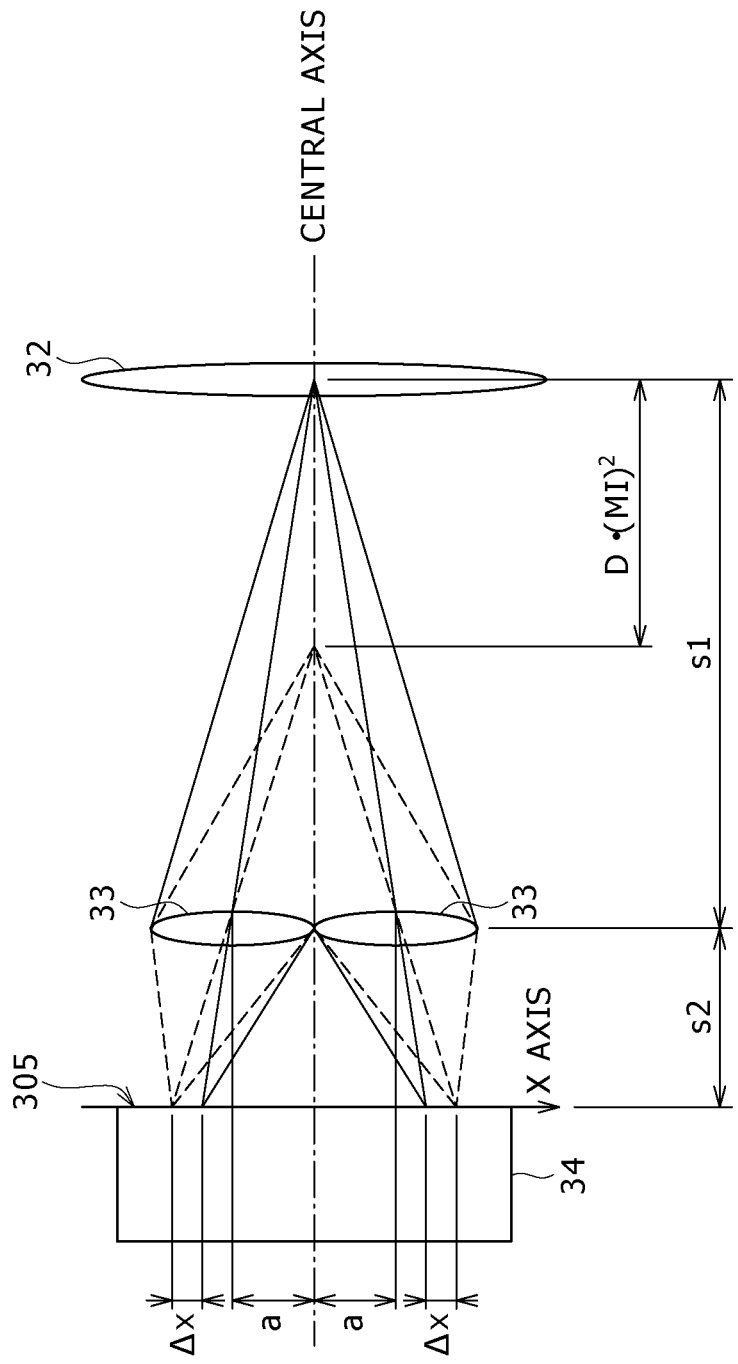
FIG. 7 is another explanatory diagram to be referred to in description of parameters used in formulation of a characteristic quantity showing the focus shift degree of an illumination field diaphragm.

The principle of detection of the focus shift quantity is explained by referring to FIG. 7 as follows. FIG. 7 is an explanatory diagram referred to in the following description of parameters used in formulation of the characteristic quantity showing the focus shift degree of the illumination field diaphragm.

In the optical system like one shown in FIG. 7, the condenser lens 32 provided at a location in close proximity to the image taking surface 305 directs the light beam having a plurality of image heights to the two eye lenses 33 whereas the two eye lenses 33 create two images respectively on the image taking surface 305. As shown in FIG. 7, reference symbol a denotes a shift quantity of the two eye lenses 33 in a planar direction from the central axis. Reference symbol s1 denotes the distance between the condenser lens 32 and the two eye lenses 33 whereas reference symbol s2 denotes the distance between the two eye lenses 33 and the image taking surface 305.

In this optical system, from the geometrical relation shown in FIG. 7, a movement distance Δx in a planar direction on the image taking surface 305 can be expressed by Equation 104 given below. In this case, if the order of the thickness change of the slide glass and the order of the distance s1 between the condenser lens 32 and the two eye lenses 33 are taken into consideration, it is possible to conceive that the following relation holds true: s1>>D·(MI)$^2$. Thus, by making use of the relation MA=(s2/s1) expressing the magnifying power MA, Equation 104 can be changed to Equation 105 also given below. In accordance with Equation 103, the focal-point shift distance D is proportional to the thickness change Δt of the slide glass. Thus, it is obvious that the movement distance Δx in a planar direction on the image taking surface 305 is proportional to the thickness change Δt of the slide glass.

$$\Delta x = D \cdot (MI)^2 \cdot \left(\frac{a}{s1}\right) \cdot \left(\frac{s2}{s1 - D \cdot (MI)^2}\right) \quad \text{(Equation 104)}$$

$$\Delta x = D \cdot (MI)^2 \cdot \left(\frac{a}{s1}\right) \cdot (MA) \propto \Delta t \quad \text{(Equation 105)}$$

Accordingly, the focal-point shift distance D which is the characteristic quantity representing the amount of focus blurring of the illumination field diaphragm 205 can be found by the planar movement distance Δx of the image B or C created on the image taking device 34.

In-Focus Position of the Illumination Field Diaphragm

Figure 8:
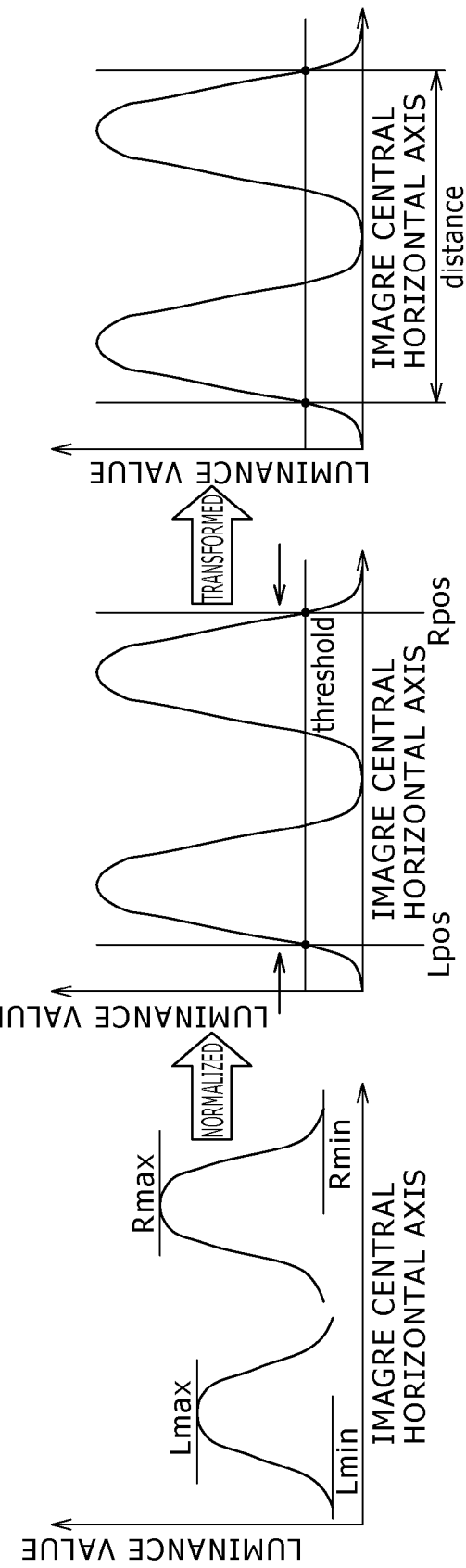
FIGS. 8A to 8C are explanatory diagrams to be referred to in description of a method for detecting an illumination position on a phase-difference image.

Before explaining processing carried out by the characteristic-quantity computation block 507 to compute the focal-point shift distance D, first of all, the proper position of the illumination field diaphragm 205 is described by referring to FIG. 8.

In the phase-difference AF optical system 301 according to this embodiment, two observation-object images are formed on the image taking device 34 as phase-difference images. If the relation between the positions of the illumination field diaphragm 205 and the condenser lens is proper and illumination light is properly radiated to the slide glass, in the phase-difference images, the position of a window representing a field area on the image created by the two eye lenses 33 for the left eye is the same as the position on the image created by the two eye lenses 33 for the right eye. If the relation between the positions of the illumination field diaphragm 205 and the condenser lens is not proper or, to be more specific, if the illumination position is shifted downward to the optical source 21 from the correct position, however, the window representing the field area on a phase-difference image is shifted in the x-axis direction toward the center of the image taking device 34 shown in FIG. 7. If the illumination position is shifted upward from the correct position, on the other hand, the window representing the field area on a phase-difference image is shifted in the x-axis direction toward the edge portion of the image taking device 34. Thus, by focusing attention on the relation between the positions of the windows formed on the image taking device 34, the illumination position can be identified.

In this embodiment, the gap between the left and right window positions on the two phase-difference images respectively is measured in advance for each of a plurality of different illumination positions set in advance, that is, typically for each of a plurality of different distances set in advance between the illumination field diaphragm 205 and the condenser lens. In this way, it is possible to grasp in advance a relation between the illumination position and the gap separating the positions of the right and left windows from each other. If the illumination position is expressed as the distance from the correct illumination position in this relation, the distance from the correct illumination position can be found from the gap separating the positions of the right and left windows from each other.

In the process of finding the distance from the correct illumination position, the gap between the left and right window positions on the two phase-difference images respectively can be identified as shown in FIG. 8. In this figure, the horizontal axis is the X axis which passes through the center of the image taking device 34 and is oriented in the direction of the width of the image taking device 34. The reader is requested to focus attention on the magnitudes of a signal output by the image taking device 34 along the X axis. In this case, the magnitudes of the output signal are the signal luminance values. Two images are created on the image taking device 34. The two images are images for the left and right eyes respectively. Thus, as shown in FIG. 8A, a distribution of luminance values for the image for the left eye and a distribution of luminance values for the image for the right eye are detected.

First of all, luminance values of the images for the left and right eyes are smoothed in a movement averaging process. Then, the maximum luminance value Lmax of the image for the left eye, the maximum luminance value Rmax of the image for the right eye, the minimum luminance value Lmin of the image for the left eye and the minimum luminance value Rmin of the image for the right eye are detected. Subsequently, the luminance values of the image for the left eye and the luminance values of the image for the right eye are normalized independently of each other. The result of these normalizations is the luminance distribution shown in FIG. 8B. Then, for the normalized distribution of luminance values, positions of pixels on the image for the left eye are searched in the right direction starting from the left-side end of the normalized distribution of luminance values till the position of the first pixel with a luminance value greater than the threshold luminance value is found. By the same token, positions of pixels on the image for the right eye are searched in the left direction starting from the right-side end of the normalized distribution of luminance values till the position of the first pixel with a luminance value greater than the threshold luminance value is found. As a result of the search operations, as shown in FIG. 8B, the coordinate Lpos is found as the position of the first pixel with a luminance value greater than the threshold luminance value for the image for the left eye whereas the coordinate Rpos is found as the position of the first pixel with a luminance value greater than the threshold luminance value for the image for the right eye. Finally, the difference between the coordinates Lpos and Rpos is taken as the gap between the left and right windows on the two phase-difference images respectively.

By identifying the correlation between the illumination position and the gap separating the window positions from each other as described above, on the basis of an actually measured gap between window positions and the correlation, the illumination position can be identified. In addition, by measuring a correlation between the illumination position and the thickness t of the slide glass in advance, the thickness t of the slide glass can be computed on the basis of the identified illumination position.

It is thus possible to carry out focus adjustment for the illumination field diaphragm 205 in order to find a correct illumination position by making use of a difference from the proper illumination position computed in accordance with the method like the one described above. However, the characteristic-quantity computation block 507 according to this embodiment carries out focus adjustment for the illumination field diaphragm 205 in accordance with a method like one described as follows.

Characteristic-Quantity Computation Processing of the Characteristic-Quantity Computation Block Next, the following description concretely explains processing carried out by the characteristic-quantity computation block 507 employed in the overall control section 50 to compute the characteristic quantity. The processing to compute the characteristic quantity is processing to compute the focal-point shift distance D. The processing carried out by the characteristic-quantity computation block 507 according to this embodiment to compute the characteristic quantity as described below is processing performed on a light-intensity signal representing data of the phase-difference images. The light-intensity signal can be said to be a signal representing the intensity of a light beam detected by pixels composing the image taking device 34 or a signal representing the luminance of light detected by pixels composing the image taking device 34. By the intensity of a light beam detected by pixels composing the image taking device 34, the intensity of received light is implied.

As is obvious from Equation 105, by detecting the planar movement distance $\Delta x$ proportional to the focal-point shift distance D, the change $\Delta t$ of the thickness of the slide glass can be detected. When the relation between the positions of the illumination field diaphragm 205 and the condenser lens is proper for the slide glass having a thickness t, the left-side and right-side phase-difference images of the illumination field diaphragm 205 are said to be in an in-focus state. When the left-side and right-side phase-difference images of the illumination field diaphragm 205 are in an in-focus state, the phase-difference images are conceivably distributed uniformly in the horizontal direction also referred to as the x-axis direction. Thus, the characteristic-quantity computation block 507 carries out signal processing like one described below in order to compute the focal-point shift distance D which is the characteristic quantity representing the focus shift degree of the illumination field diaphragm 205.

Figure 9:
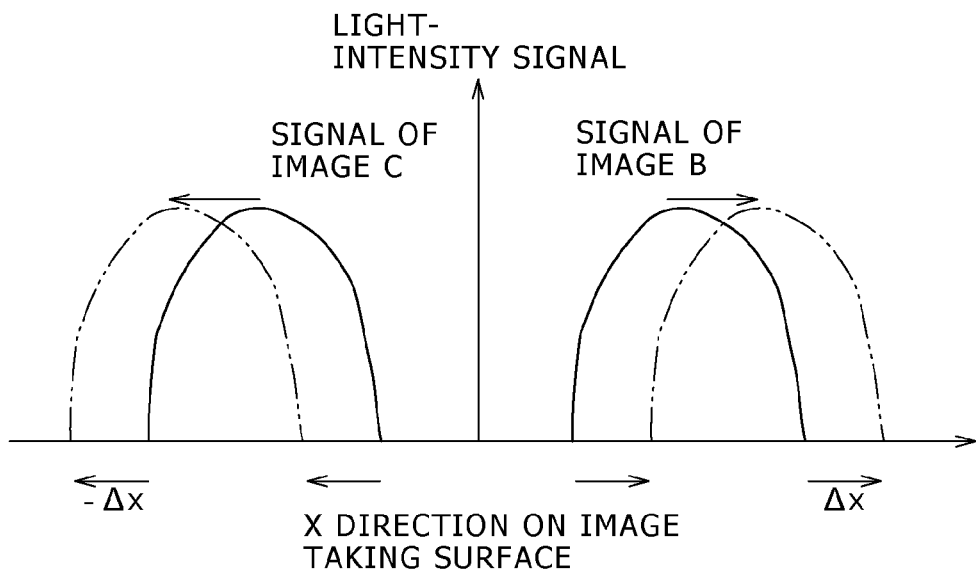
FIG. 9 is an explanatory diagram to be referred to in description of a focusing method according to the same embodiment.

The characteristic-quantity computation block 507 refers to the phase-difference image data obtained by the phase-difference-image acquisition block 503 in order to identify a light-intensity signal generated by the phase-difference images formed on the image taking surface 305. In this case, the phase-difference images are images B and C shown in FIG. 9. Then, the characteristic-quantity computation block 507 computes values like ones described below by considering the fact that, in a defocus state, the phase-difference image on the left side moves over the image taking surface 305 in a direction opposite to the direction in which the phase-difference image on the right side moves over the image taking surface 305 as shown in FIG. 9.

That is to say, the characteristic-quantity computation block 507 computes a difference $A_i$ between the signal intensity $f(x_i)$ of the image B formed on pixels $x_i$ of the image taking device 34 and the signal intensity $g(x_i)$ of the image C formed on the pixels $x_i$ in accordance with Equation 106 given below. Then, the characteristic-quantity computation block 507 finds a sum A from the computed signal-intensity differences $A_i$ in accordance with Equation 107 given as follows.

$$A_i = f(x_i) - g(x_i) \quad \text{(Equation 106)}$$

$$A = \sum_i A_i \quad \text{(Equation 107)}$$

In this case, when the illumination field diaphragm 205 is in an in-focus state, the equation $f(x_i)=g(x_i)$ holds true. Thus, the equation A=0 also holds true as well. If a change $\Delta t$ of the thickness of the slide glass gives rise to a shift from the position in the in-focus state, however, the sum A is expressed by Equation 108 as follows:

$$A = k \cdot D \cdot (MI)^2 \cdot \left(\frac{a}{s1}\right) \cdot (MA) \quad \text{(Equation 108)}$$

In the above equation, reference symbol k denotes the number of pixels on the image taking device 34. That is to say, the suffix i used in Equation 107 has the following values: i= 1, - - - , k.

Since quantities denoted by reference symbols k, a, s1, MA and MI used in Equation 108 are design values peculiar to the microscope 1 according to this embodiment, the characteristic-quantity computation block 507 is capable of computing the focal-point shift distance D on the basis of the computed sum A.

The reader is advised to keep in mind that it is nice to drive the characteristic-quantity computation block 507 to carry out the processing to compute the characteristic quantity when the biological sample SPL put on the stage 40 is in an in-focus state but it is desirable to drive the characteristic-quantity computation block 507 to carry out the processing when the biological sample SPL put on the stage 40 is not in an in-focus state. In other words, it is desirable to drive the characteristic-quantity computation block 507 to carry out the processing to compute the characteristic quantity when the transmitted light passing through the biological sample SPL is not in a state of being converged on the image taking device 24 provided in the image creation optical system 211. This is because, if the transmitted light passing through the biological sample SPL is in a state of being converged on the image taking device 24, an output signal for the images B and C will include a signal for the biological sample SPL so that it will be quite within the bounds of possibility that the computed characteristic quantity is erroneous.

In order to reduce the magnitude of an error included in the computed characteristic quantity, the overall control section 50 may adjust the intensity of the illumination light so that the intensity of the output signal for the phase-difference images formed on the image taking device 34 gets saturated. In addition, in an operation to form the image of the frame of the illumination field diaphragm 205 on the image taking device 34, it is desirable to accommodate the image of the frame of the illumination field diaphragm 205 in the frame of the image taking device 34. In other words, it is desirable to form the image of the frame of the illumination field diaphragm 205 on the image taking device 34 by preventing the light beam representing the frame (or the shape) of the illumination field diaphragm 205 from being kicked repeatedly by a variety of diaphragms existing in the optical systems. Thus, the characteristic-quantity computation block 507 is capable of computing the characteristic quantity with a higher degree of accuracy.

On the basis of the focal-point shift quantity D computed by the characteristic-quantity computation block 507 as the characteristic quantity, the overall control section 50 according to this embodiment carries out focus adjustment for the illumination field diaphragm 205.

If the magnifying power of the condenser lens 209 provided inside the transmission illumination rear-stage optical system 203 is 0, the focal-point shift distance of the condenser lens A is equal to the condenser-lens shift distance $\Delta Z$. Thus, the characteristic-quantity computation block 507 outputs information representing the computed focal-point shift distance D to the condenser-lens-driving control section 53. The condenser-lens-driving control section 53 controls and drives the condenser-lens driving mechanism 42 in accordance with the focal-point shift distance D received from the characteristic-quantity computation block 507 in order to move the condenser lens 209 in the direction of the optical axis of the condenser lens 209. Thus, the image of the illumination field diaphragm 205 can be formed on the image taking surface of the image taking device.

It is to be noted that the magnifying power of the condenser lens 209 provided inside the transmission illumination rear-stage optical system 203 can be set at any arbitrary value. It is also worth noting that, if the magnifying power of the condenser lens 209 is set at a value other than 0, the relation between the focal-point shift distance D and the condenser-lens shift distance $\Delta Z$ is determined by a relation peculiar to the condenser lens 209. Thus, a function of correlation between the focal-point shift distance D and the condenser-lens shift distance $\Delta Z$ is stored in advance typically in the storage block 517 employed in the overall control section 50. In this case, the characteristic-quantity computation block 507 determines the condenser-lens shift distance $\Delta Z$ on the basis of the focal-point shift distance D by making use of the correlation function stored in the storage block 517. The characteristic-quantity computation block 507 outputs the condenser-lens shift distance $\Delta Z$ determined in this way to the condenser-lens-driving control section 53 in order to carry out the focus adjustment for the illumination field diaphragm 205.

By carrying out the processing described above, the condenser-lens driving mechanism 42 provided for any arbitrary lens existing inside the transmission illumination rear-stage optical system 203 can be driven to automatically correct a focus shift caused by the thickness change $\Delta t$ of the slide glass as the focus shift of the illumination field diaphragm 205. By carrying out the processing described above every time the slide glass is replaced by another one, the microscope 1 according to this embodiment is capable of adjusting the focus for the illumination field diaphragm 205 without regard to the slide glass used for the observation.

As described above, the characteristic-quantity computation block 507 according to this embodiment makes use of the output signal for the phase-difference images generated by the phase-difference AF optical system 301 and values peculiar to the microscope 1 in order to carry out the processing of computing the focus shift quantity of the illumination field diaphragm 205. Typical values peculiar to the microscope 1 include design parameters. The condenser-lens-driving control section 53 serving as a typical section for carrying out focus adjustment for the illumination field diaphragm 205 controls the condenser-lens driving mechanism 42 in accordance with a focal shift distance received from the characteristic-quantity computation block 507 in order to carry out focus adjustment for the illumination field diaphragm 205.

By carrying out the focus adjustment processing for the illumination field diaphragm 205, the microscope 1 according to this embodiment is capable of automating the focus adjustment for the illumination field diaphragm 205 and the substance of processing based on the existing visual method can be implemented quantitatively. In addition, since the focus adjustment for the illumination field diaphragm 205 can be carried out in the phase-difference AF optical system, by making use of the same microscope, the existing phase difference AF can be implemented on the surface of the biological sample SPL.

Processing to Adjust the Stage Position

A plurality of samples SPL to be observed by making use of the microscope 1 are prepared and set along with a plurality of cover glasses having different thicknesses and a plurality of slide glasses also having different thicknesses. In an operation to observe a thin biological sample SPL, a slide glass with a thickness of about 1.1 mm may be used. This thickness is greater than the thickness of the cover glass and the thickness of the biological sample SPL by at least one digit. In addition, the thickness of the slide glass may have variations of about several hundreds of micrometers. Thus, in the case of the existing microscope in which the slide glass is held on the upper surface of the slide-glass driving stage and the sample is observed by making use of the microscope optical system provided above the slide glass, the distance between the surface of the sample and the microscope optical system varies in accordance with a change of the thickness of the slide glass. As a result, there is raised a problem that an image of the observed surface of the sample blurs due to a defocus state of the surface.

In order to solve this problem, in the overall control section 50 according to this embodiment, on the basis of phase-difference image data acquired by the phase-difference-image acquisition block 503, the thickness-change computation block 511 computes a change of the thickness of a slide glass, on which the biological sample SPL is placed, and adjusts the position of the stage 40 in accordance with the computed change.

Equation 121 given below can be obtained by substituting Equation 103 into Equation 105. Thus, the change $\Delta t$ of the thickness of the slide glass can be computed on the basis of the parallel movement distance $\Delta x$ of the phase-difference image B or C formed on the image taking device 34.

$$\Delta x = \left(\frac{n-1}{n}\right) \cdot \Delta t \cdot (MI)^2 \cdot \left(\frac{a}{s1}\right) \cdot (MA) \qquad \text{(Equation 121)}$$

First Method for Computing the Thickness Change $\Delta t$

The thickness-change computation block 511 is capable of computing the change $\Delta t$ of the thickness of the slide glass by adoption of a typical method described as follows.

On the basis of Equations 106 and 107, the thickness-change computation block 511 computes the sum A of differences of light-intensity signals representing the phase-difference images. It is to be noted that, since this sum A is the same as the sum A computed by the characteristic-quantity computation block 507, the thickness-change computation block 511 may acquire the sum A computed by the characteristic-quantity computation block 507 instead of computing the sum A by itself. In either case, the thickness-change computation block 511 then makes use of the sum A in processing carried out to compute the change $\Delta t$ of the thickness of the slide glass.

In this case, if the change $\Delta t$ of the thickness of the slide glass gives rise to a state of being shifted from the in-focus state, the sum A is expressed by Equation 122 as follows:

$$A = k \cdot \Delta t \cdot \left(\frac{n-1}{n}\right) \cdot (MI)^2 \cdot \left(\frac{a}{s1}\right) \cdot (MA) \qquad \text{(Equation 122)}$$

In the above equation, reference symbol k denotes the number of pixels on the image taking device 34. That is to say, the suffix i mentioned earlier has the following values: i= 1, - - -, k.

Since quantities denoted by reference symbols k, a, s1, MA and MI used in Equation 122 are design values peculiar to the microscope 1 according to this embodiment, the thickness-change computation block 511 is capable of computing the change $\Delta t$ of the thickness of the slide glass on the basis of the refractive index n of the slide glass and the computed sum A.

Second Method for Computing the Thickness Change $\Delta t$

In addition, the thickness-change computation block 511 is also capable of computing the change $\Delta t$ of the thickness of the slide glass by adoption of another typical method described below. It is to be noted that, in processing described below, it is assumed that information representing the position of the edge of the phase-difference image B and/or the C in the in-focus state has been stored in advance in the storage block 517 or the like. A typical example of the information representing the position of the edge is the coordinates of the position of the edge.

The thickness-change computation block 511 requests the edge-position detection block 509 to carry out edge-position detection processing on phase-difference image data acquired by the phase-difference-image acquisition block 503. At the request made by the thickness-change computation block 511, the edge-position detection block 509 carries out the processing to detect the position of the edge of the phase-difference image B and/or C. To be more specific, the edge-position detection block 509 detects the X coordinate $X_i$ representing the position of the edge of the phase-difference image B and/or C. The position of the edge of an image of interest is the position of an edge on one X-axis-direction side of the image. The edge-position detection block 509 then supplies information on the detected edge position to the thickness-change computation block 511.

The thickness-change computation block 511 finds a relative X coordinate of the position of the edge by computing the value of the following expression: $x_i - X$. In this expression, reference symbol $x_i$ denotes the X coordinate of the edge position supplied by the edge-position detection block 509 whereas reference symbol X denotes the X coordinate of the edge of the image taken in the in-focus state.

The relative X coordinate ($x_i - X$) of the edge position detected by the edge-position detection block 509 can be expressed by Equation 123 as follows:

$$x_i - X = \Delta t \cdot \left(\frac{n-1}{n}\right) \cdot (MI)^2 \cdot \left(\frac{a}{s1}\right) \cdot (MA) \quad \text{(Equation 123)}$$

Since quantities denoted by reference symbols a, s1 and MI used in Equation 123 are design values peculiar to the microscope 1 according to this embodiment, the thickness-change computation block 511 is capable of computing the change $\Delta t$ of the thickness of the slide glass on the basis of the refractive index n of the slide glass and the relative X coordinate of the edge position.

It is to be noted that, in accordance with this method, the change $\Delta t$ of the thickness of the slide glass is computed on the basis of the position of the edge of the illumination field diaphragm 205. Thus, it is desirable to set the magnifying power MI of the phase-difference AF optical system 301 at such a value that the edge of the illumination field diaphragm 205 is detected on the image taking device 34. By adoption of the method like the one described above, the effect on the shading of the illumination light can be eliminated.

It is to be noted that the processing carried out by the thickness-change computation block 511 like the one described above to detect the change $\Delta t$ of the thickness of the slide glass can be carried out in a state in which the focus coincides with the biological sample SPL placed on the stage 40 or in a state in which the focus does not coincide with the biological sample SPL.

On the basis of the thickness change $\Delta t$ computed by the thickness-change computation block 511, the overall control section 50 according to this embodiment adjusts the position of the stage 40.

As shown in diagrams such as FIG. 3, if the slide glass is put on the stage 40 on the same side as the image creation optical system 211, the defocus quantity of the surface of the biological sample SPL is equal to the change $\Delta t$ of the thickness of the slide glass. For this reason, the thickness-change computation block 511 supplies the information representing the change $\Delta t$ of the thickness of the slide glass also to the stage-driving control section 52. The stage-driving control section 52 drives and controls the stage driving mechanism 41 in accordance with the change $\Delta t$ of the thickness of the slide glass. As a result, the stage 40 is moved in a direction toward the image creation optical system 211 by a movement distance equal to the change $\Delta t$ of the thickness of the slide glass. Thus, the microscope 1 according to this embodiment is capable of correcting a focus shift caused by the change $\Delta t$ of the thickness of the slide glass as a shift relative to the surface of the biological sample SPL.

Therefore, the thickness-change computation block 511 holds predetermined position coordinates for the in-focus state such as the state of the optical systems shown in FIG. 3 in advance. The predetermined in-focus position coordinates include the coordinates of the edges of the phase-difference images formed on the image taking surface 305 and coordinates of the position of the stage 40. The predetermined in-focus position coordinates are taken as reference values to be used by the thickness-change computation block 511 to compute the change $\Delta t$ of the thickness of the slide glass. Then, when a biological sample SPL having a slide glass with a different thickness is placed on the stage 40 as shown in FIG. 4, the thickness-change computation block 511 computes changes of the coordinates of the positions of the edges on the basis of the pre-stored reference values and the coordinates of the edges of the phase-difference images formed on the image taking surface 305. Subsequently, the overall control section 50 drives the stage 40 in accordance with the computed change $\Delta t$ of the thickness of the slide glass so that the biological sample SPL can be observed with the image of the surface of the sample SPL formed on the image taking device 24.

As explained earlier, the thickness-change computation block 511 adopts a method for computing the change $\Delta t$ of the thickness of the slide glass on the basis of the position of an edge on a side on which the shape of the illumination field diaphragm 205 exists in the phase-difference image B or C for the phase-difference image B or C. It is to be noted, however, that the method for computing the change $\Delta t$ of the thickness of the slide glass is by no means limited to this method. For example, the thickness-change computation block 511 may also adopt a method for computing the change $\Delta t$ of the thickness of the slide glass on the basis of the position of an edge on a side on which the shape of the illumination field diaphragm 205 exists in each of the phase-difference images B and C for each of the phase-difference images B and C. As an alternative, the thickness-change computation block 511 may also adopt a method for computing the change $\Delta t$ of the thickness of the slide glass on the basis of a sum of the positions of edges on sides on which the shape of the illumination field diaphragm 205 exists in each of the phase-difference images B and C for each of the phase-difference images B and C. By adoption of any of these methods, the thickness-change computation block 511 is capable of preventing errors from being generated by a shift of a formed image and by a distortion.

As described above, the thickness-change computation block 511 according to this embodiment makes use of the output signal for the phase-difference images generated by the phase-difference AF optical system 301 and values peculiar to the microscope 1 in order to carry out the processing of computing the thickness of the slide glass and/or a change of the thickness of the slide glass. Typical values peculiar to the microscope 1 include design parameters. In addition, the overall control section 50 according to this embodiment controls the position of the stage 40 in accordance with the computed change $\Delta t$ of the thickness of the slide glass. It is thus possible to cancel a slide-glass thickness change causing a largest change in the thickness direction and observe the biological sample SPL with a high degree of accuracy.

On top of that, since the change $\Delta t$ of the thickness of the slide glass is computed, the focus adjustment for the surface of the biological sample SPL can be carried out on the basis of the computed change $\Delta t$ of the thickness of the slide glass independently of the position of the surface of the biological sample SPL, that is, independently of the optical-axis direction shift of the position of the surface of the biological sample SPL. Thus, the focus adjustment for the surface of the biological sample SPL can be carried out even if a large defocus quantity is generated by a change $\Delta t$ of the thickness of the slide glass to result in a state in which the surface of the biological sample SPL produces almost no signal. By adopting the methods as described above, the focus adjustment for the surface of the biological sample SPL can be carried out without making use of information from the surface of the biological sample SPL.

In addition, by making use of the existing optical system usable for the focus adjustment for the surface of a sample, the focus adjustment can be carried out in one apparatus for both the illumination field diaphragm 205 and the surface of the biological sample SPL. On top of that, after the stage 40 has been driven on the basis of the detected change of the thickness of the slide glass, the existing phase-difference AF processing is carried out by observing the surface of the biological sample SPL by making use of the phase-difference AF optical system. Thus, by making use of the same optical system, the focus adjustment processing can be carried out.

Brightness-Unevenness Correction Processing

As explained earlier, the amplitude of slide-glass thickness changes is large. In the case of a slide glass with a certain thickness, the optical system may be put in an in-focus state. If the thickness of the slide glass is changed, however, the optical system may no longer be put in the in-focus state due to the change of the thickness of the slide glass. As a result, it is quite within the bounds of possibility that the brightness of the enlarged image formed on the image taking device 24 as an image of an observation object becomes uneven due variations in slide-glass thickness.

In order to solve the problem described above, as explained earlier, if the thickness of the slide glass changes, removing the illumination field diaphragm 205 from the in-focus state, the microscope 1 according to this embodiment adjusts the position of the illumination optical system in order to put the illumination field diaphragm 205 back in the in-focus state.

If the position of the illumination optical system has been adjusted in order to put the illumination field diaphragm 205 back in the in-focus state, the unevenness of the brightness of the taken image can be considered to be uniform. Thus, the overall control section 50 according to this embodiment prestores a brightness-unevenness correction pattern to be used for correcting brightness unevenness into the brightness of an image taken in the in-focus state in the storage block 517 or the like. Then, the brightness correction block 513 according to this embodiment makes use of the brightness-unevenness correction pattern stored in the storage block 517 or the like in advance as a common brightness-unevenness correction pattern in order to correct brightness unevenness included in an observation-object image taken after the focus adjustment has been carried out to put the illumination field diaphragm 205 in the in-focus state.

In addition, even if the focus adjustment for the illumination field diaphragm 205 is not carried out, by adoption of a method like one described below, the brightness correction block 513 is capable of correcting brightness unevenness which may exist in a taken observation-object image. In accordance with this method, the brightness correction block 513 prepares a plurality of brightness-unevenness correction patterns each provided for one of the same plurality of slide-glass thicknesses and stores the brightness-unevenness correction patterns in the storage block 517 or the like in advance. Then, in accordance with the computed thickness of the slide glass, the brightness correction block 513 selects a brightness-unevenness correction pattern to be used in processing to correct the unevenness of the brightness from the stored brightness-unevenness correction patterns. Finally, the brightness correction block 513 makes use of the selected brightness-unevenness correction pattern to correct the unevenness of the brightness.

The brightness correction block 513 carries out the processing to correct the unevenness of the brightness as described above, allowing a proper observation-object image to be obtained.

The above description has explained details of various kinds of processing carried out by the microscope 1 according to this embodiment.

In accordance with the above description, the condenser-lens driving mechanism 42 drives the condenser lens employed in the transmission illumination rear-stage optical system 203. It is to be noted, however, that if the focus adjustment can be carried out for the illumination field diaphragm 205, other lenses or the entire illumination optical system may also be driven.

In addition, in accordance with the above description, a focus shift of the illumination field diaphragm 205 is caused by a change of the thickness of the slide glass. In accordance with the focusing method according to this embodiment, however, it is also possible to detect a focus shift attributed to another cause as a focus shift for the illumination field diaphragm 205 and carry out focus adjustment by making use of the detected focus shift.

On top of that, in accordance with the above description, a focus shift for the illumination field diaphragm 205 is detected in the phase-difference AF optical system 301. However, it is also possible to detect a focus shift for the surface of the biological sample SPL in the phase-difference AF optical system 301 and carry out focus adjustment for the surface of the biological sample SPL by making use of the detected focus shift.

Typical Modifications

In accordance with the above description, the characteristic-quantity computation block 507 makes use of a signal intensity described in phase-difference image data in order to compute the focal-point shift distance D serving as a characteristic quantity. However, the characteristic-quantity computation block 507 may also compute the characteristic quantity by adoption of a method described as follows.

Figure 10:
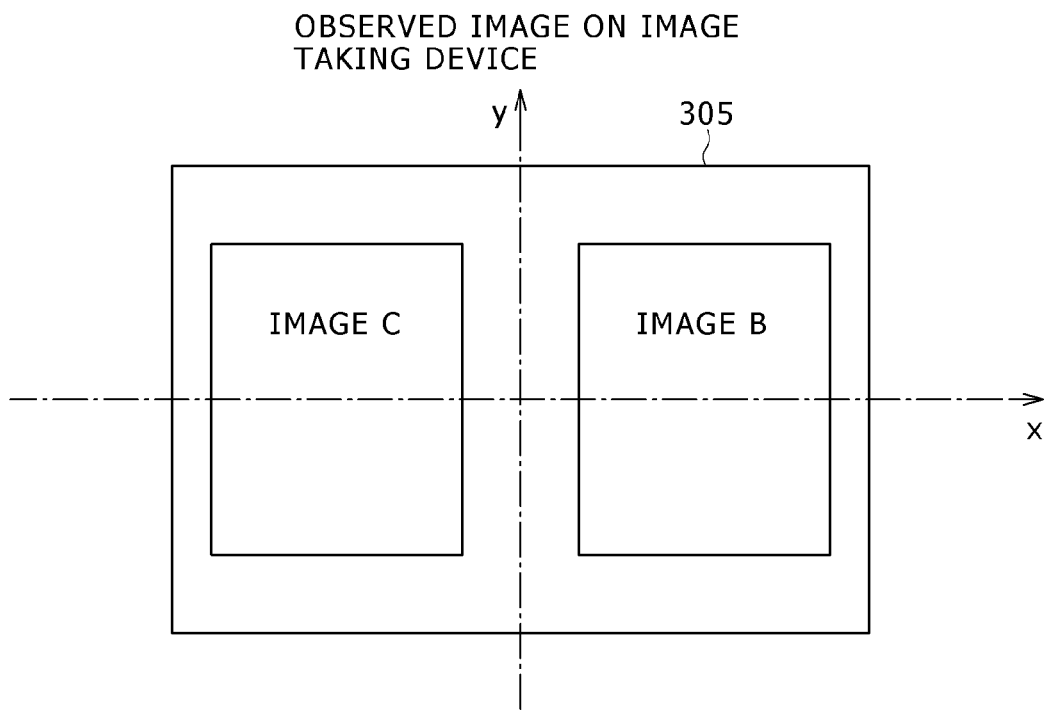
FIG. 10 is an explanatory diagram to be referred to in description of a focusing method according to a second embodiment.

As described before, the focal-point shift distance D can be computed from the planar movement distance $\Delta x$ in accordance with Equation 105. In this case, in order to determine the planar movement distance $\Delta x$ from the phase-difference images, edges of images B and C formed on the image taking device 34 like typically one shown in FIG. 10 to serve as phase-difference images are detected. In this case, the X axis shown in FIG. 10 to serve as the horizontal axis is an axis coinciding with the longitudinal central line of the image taking surface 305 of the image taking device 34 and dividing the image taking surface 305 into upper and lower portions separated away from each other in the width direction symmetrically with respect to the axis. On the other hand, the y axis shown in FIG. 10 to serve as the vertical axis is an axis coinciding with the transversal central line of the image taking surface 305 of the image taking device 34 and dividing the image taking surface 305 into left and right portions separated away from each other in the length direction symmetrically with respect to the axis.

Figure 11:
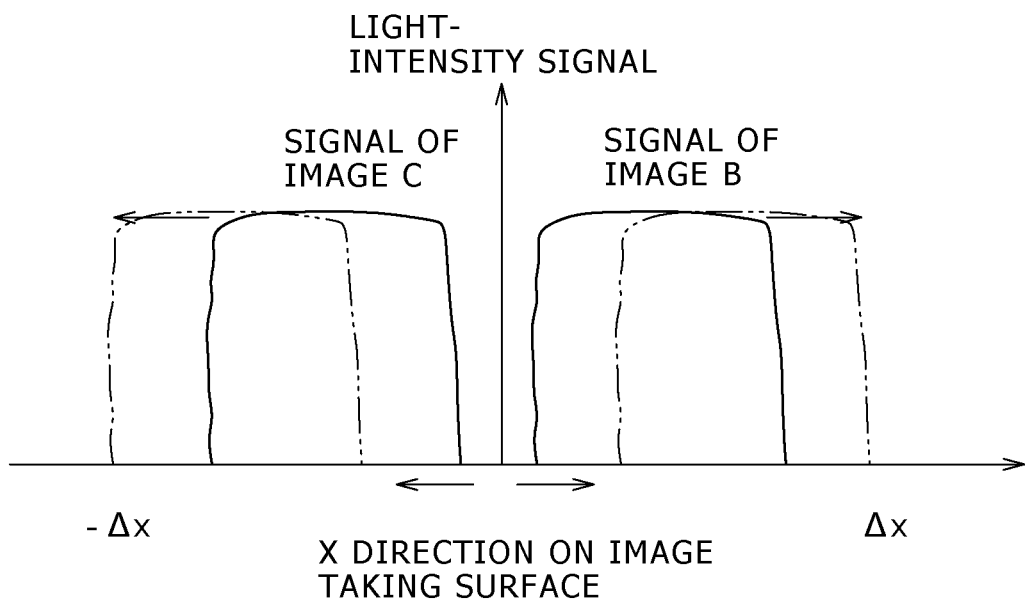
FIG. 11 is another explanatory diagram to be referred to in description of a focusing method according to the same embodiment.
Figure 12:
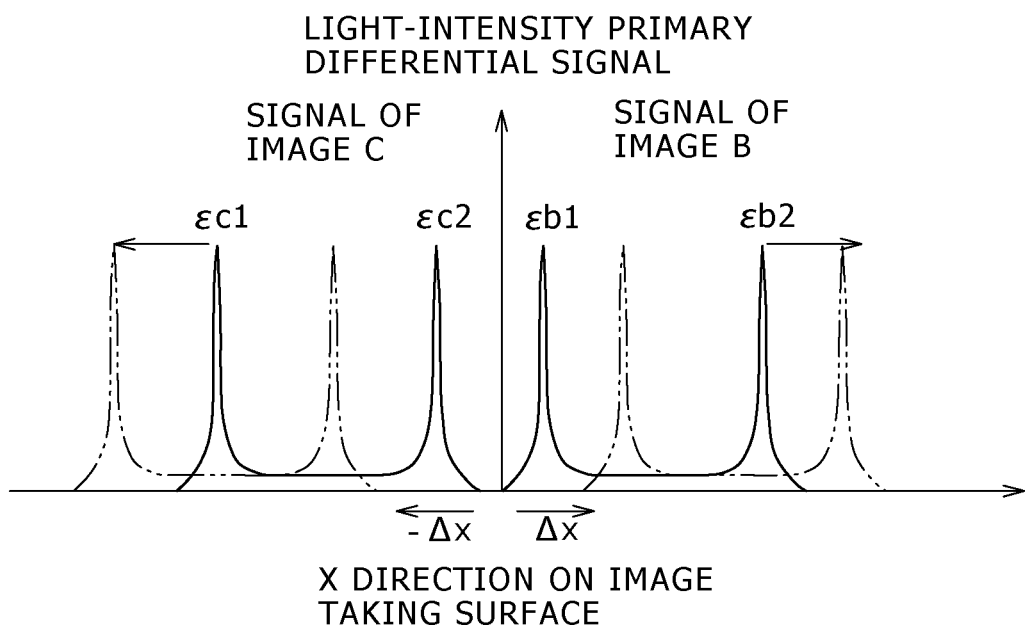
FIG. 12 is still another explanatory diagram to be referred to in description of a focusing method according to the same embodiment.

FIG. 11 is a diagram showing a distribution of intensities in the x-axis direction for y=0. If an image formed on the image taking device 34 as an image of the illumination field diaphragm 205 has a uniform distribution of intensities as shown in FIG. 11, the magnitude of the signal abruptly changes only on the edge of the image. Thus, if the signals of the images B and C are differentiated with respect to x, a waveform shown in FIG. 12 as the waveform of a differential signal resulting from the differentiation is obtained. As shown in FIG. 12, every peak of the differential signal can be regarded as an edge. The reader is advised to keep in mind that, in order to obtain an image provided with a uniform distribution of intensities to serve as an image of the illumination field diaphragm 205, it is desirable to let the overall control section 50 adjust the intensity of the illumination light so that the intensity of the output signal representing the phase-difference images formed on the image taking device 34 is put in a saturated state. In the case of this embodiment, two phase-difference images are formed on the image taking device 34 and each of the phase-difference images has two edges separated from each other in the x-axis direction. Thus, the edge-position detection block 509 carries out processing to detect a total of four edges of the two phase-difference images in order to determine the coordinate of the position of each of the four edges.

In this case, let reference symbol $\epsilon$ denote the coordinate of the position of an edge. To put in detail, let reference symbol $\epsilon c1$ denote the coordinate of the position of an edge on the left end of the phase-difference image C, symbol $\epsilon c2$ denote the coordinate of the position of an edge on the right end of the phase-difference image C, symbol $\epsilon b1$ denote the coordinate of the position of an edge on the left end of the phase-difference image B and symbol $\epsilon b2$ denote the coordinate of the position of an edge on the right end of the phase-difference image B as shown in FIG. 12. Due to the defocus state of the illumination field diaphragm 205, the coordinates of the positions of the edges of the phase-difference image C are shifted by a distance $-\Delta x$ whereas the coordinates of the positions of the edges of the phase-difference image B are shifted by a distance $+\Delta x$.

The edge-position detection block 509 supplies at least one of four coordinates detected as the coordinates of the positions of the four edges to the characteristic-quantity computation block 507. The characteristic-quantity computation block 507 pays attention to at least one of the four coordinates received from the edge-position detection block 509. For example, the characteristic-quantity computation block 507 may pay attention to only the edge-position coordinate $\epsilon b1$ in order to detect the planar movement distance $\Delta x$. In this case, the phase-difference AF optical system 301 can be an optical system making use of one eye lens instead of an optical system making use of two eye lenses.

In addition, when the planar movement distance $\Delta x$ is detected for one edge position coordinate and an image creation surface shift $\Delta x_0$ exists, the detected planar movement distance $\Delta x$ becomes $(\Delta x + \Delta x_0)$. That is to say, the planar movement distance $\Delta x$ is affected by the image creation surface shift $\Delta x_0$. In order to eliminate the effect of the image creation surface shift $\Delta x_0$, the characteristic-quantity computation block 507 computes the detected planar movement distance $\Delta x$ in accordance with either of the following equations:

$$\Delta x = (\epsilon b1 - \epsilon c2)/2 \text{ or}$$

$$\Delta x = (\epsilon b2 - \epsilon c1)/2$$

Figure 13:
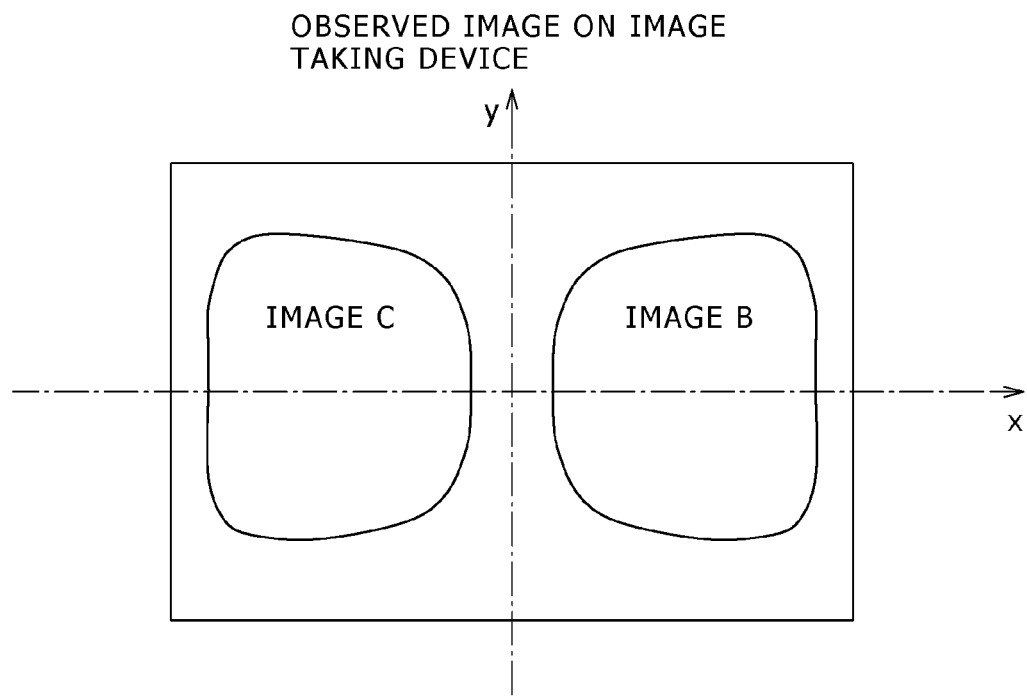
FIG. 13 is still another explanatory diagram to be referred to in description of a focusing method according to the same embodiment.

In addition, if a distortion exists as shown in FIG. 13 in the phase-difference AF optical system 301 making use of two eye lenses 33, due to the distortion, shifts are generated at the left and right edge image formation positions in the same image as shown in FIG. 13.

Figure 14:
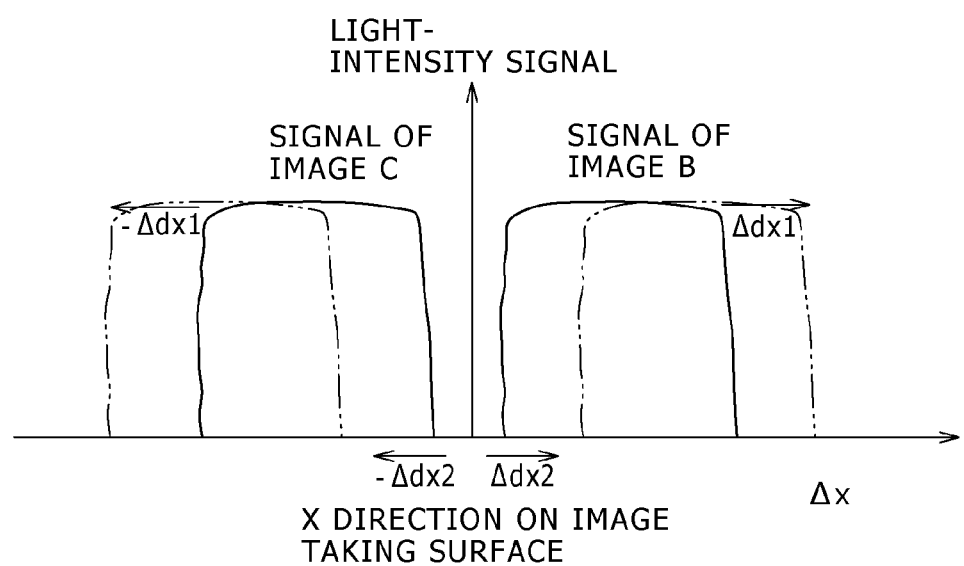
FIG. 14 is still another explanatory diagram to be referred to in description of a focusing method according to the same embodiment.

If the two eye lenses 33 are provided at respectively two locations symmetrical with respect to the central axis as shown in FIG. 7, the shift distance of the left-side edge of the phase-difference image C and the shift distance of the right-side edge of the phase-difference image B are equal to $|\Delta dx1|$ as shown in FIG. 14. By the same token, the shift distance of the right-side edge of the phase-difference image C and the shift distance of the left-side edge of the phase-difference image B are equal to $|\Delta dx2|$ as shown in FIG. 14. Thus, in order to eliminate the effect of the distortion, the characteristic-quantity computation block 507 computes the detected planar movement distance $\Delta x$ in accordance with the following equation:

$$\Delta x = \{(\epsilon c1 + \epsilon c2) - (\epsilon b1 + \epsilon b2)\}/4$$

By making use of the planar movement distance $\Delta x$ computed as described above, the characteristic-quantity computation block 507 is capable of finding the focal-point shift distance D in accordance with Equation 105.

As explained above, the characteristic-quantity computation block 507 according to this embodiment detects the positions of the edges of the illumination field diaphragm 205 in the phase-difference images formed on the image creation surface as the phase-difference images generated in the phase-difference AF optical system 301 and computes the focus shift quantity on the basis of the coordinates of the detected positions of the edges. The condenser-lens-driving control section 53 serving as a typical illumination field diaphragm focus adjustment section controls the condenser-lens driving mechanism 42 in accordance with the focus shift quantity received from the characteristic-quantity computation block 507 in order to carry out focus adjustment for the illumination field diaphragm 205.

Preferred embodiments have been described above in detail by referring to attached diagrams. However, implementations of the present application are by no means limited to these embodiments. It is obvious that a person having mediocre knowledge in the field of technologies related to the present application is capable of coming up with a variety of modifications and/or corrections within the domain of technological concepts described in the ranges of claims attached to this specification of the present application. However, such modifications and corrections also of course fall within the technological range of the present application.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A microscope, comprising:
   an illumination optical system provided with an illumination field diaphragm, and one or a plurality of illumination optical devices to serve as an optical system configured to radiate illumination light to a sample placed on a stage;
   a first image creation optical system provided with a first image taking device configured to take an image based on transmitted light passing through said sample, and one or a plurality of first optical devices configured to create said image based on said transmitted light on said first image taking device;
   a second image creation optical system provided with a light-beam splitting section configured to split said transmitted light propagating in said first image creation optical system in order to get a partial light beam from said transmitted light, a second image taking device configured to take a phase-difference image based on said partial light beam, and one or a plurality of second optical devices configured to create said phase-difference image based on said partial light beam on said second image taking device;
   an illumination-field-diaphragm focus adjustment section configured to adjust an image creation position at which an image of said illumination field diaphragm is created; and
   a characteristic-quantity computation block configured to compute a characteristic quantity, which represents a focus shift degree of said illumination field diaphragm, on the basis of an output signal generated by said second image taking device, wherein said illumination-field-diaphragm focus adjustment section adjusts said image creation position for said illumination field diaphragm on the basis of said characteristic quantity computed by said characteristic-quantity computation block;

said phase-difference image includes first and second images created on said second image taking device in accordance with the shape of said illumination field diaphragm, and said characteristic-quantity computation block computes said characteristic quantity by making use of a difference in intensity between an output signal of said first image and an output signal of said second image at every pixel on said second image taking device;

a position control section configured to control the position of said stage; and a thickness-change computation block configured to compute a change of the thickness of a slide glass on which said sample is mounted, wherein said phase-difference image includes first and second images created on said second image taking device in accordance with the shape of said illumination field diaphragm, said thickness-change computation block computes a change of said thickness by making use of a difference in intensity between an output signal of said first image and an output signal of said second image at every pixel on said second image taking device, and said position control section changes the position of said stage toward said illumination optical system on the basis of said thickness change computed by said thickness-change computation block.

2. The microscope according to claim 1, wherein said characteristic-quantity computation block computes said characteristic quantity in a state in which said transmitted light passing through said sample is not focused on said first image taking device.

3. The microscope according to claim 1, wherein the intensity of said illumination light is adjusted so as to put the intensity of an output signal of said phase-difference image created on said second image taking device in a saturated state.

4. A microscope, comprising:

an illumination optical system provided with an illumination field diaphragm, and one or a plurality of illumination optical devices to serve as an optical system configured to radiate illumination light to a sample placed on a stage;

a first image creation optical system provided with a first image taking device configured to take an image based on transmitted light passing through said sample, and one or a plurality of first optical devices configured to create said image based on said transmitted light on said first image taking device;

a second image creation optical system provided with a light-beam splitting section configured to split said transmitted light propagating in said first image creation optical system in order to get a partial light beam from said transmitted light, a second image taking device configured to take a phase-difference image based on said partial light beam, and one or a plurality of second optical devices configured to create said phase-difference image based on said partial light beam on said second image taking device;

an illumination-field-diaphragm focus adjustment section configured to adjust an image creation position at which an image of said illumination field diaphragm is created; and a characteristic-quantity computation block configured to compute a characteristic quantity, which represents a focus shift degree of said illumination field diaphragm, on the basis of an output signal generated by said second image taking device, wherein said illumination-field-diaphragm focus adjustment section adjusts said image creation position for said illumination field diaphragm on the basis of said characteristic quantity computed by said characteristic-quantity computation block;

a position control section configured to control the position of said stage; and a thickness-change computation block configured to compute a change of the thickness of a slide glass on which said sample is mounted, wherein said phase-difference image includes first and second images created on said second image taking device in accordance with the shape of said illumination field diaphragm, said thickness-change computation block computes a change of said thickness by making use of a difference in edge position between said first image taken in an in-focus state and said first image taken in an actual state and/or a difference in edge position between said second image taken in an in-focus state and said second image taken in an actual state, and said position control section changes the position of said stage toward said illumination optical system on the basis of said thickness change computed by said thickness-change computation block.

5. The microscope according to claim 4, wherein said thickness-change computation block computes a change of said thickness on the basis of an edge position on a side, on which said shape of said illumination field diaphragm exists in said first or second image, for said first or second image.

6. The microscope according to claim 4, wherein said thickness-change computation block computes a change of said thickness on the basis of an edge position on a side, on which said shape of said illumination field diaphragm exists in each of said first and second images, for each of said first and second images.

7. The microscope according to claim 4, wherein said thickness-change computation block computes a change of said thickness on the basis of a sum of edge positions on both sides, on which said shape of said illumination field diaphragm exists in each of said first and second images, for each of said first and second images.

8. The microscope according to claim 1, wherein said characteristic-quantity computation block computes said characteristic quantity by making use of an edge position of said output signal.

9. The microscope according to claim 1, further comprising a brightness correction block configured to correct the brightness of an image created on said first image taking device, wherein said brightness correction block makes use of a brightness correction pattern, which has been prepared in advance as a pattern to be used in brightness correction, in order to correct the brightness of said image created on said first image taking device after said illumination-field-diaphragm focus adjustment section has adjusted said image creation position for said illumination field-diaphragm in order to put an image of said illumination field diaphragm in an in-focus state.

10. The microscope according to claim 1, further comprising
a brightness correction block configured to correct the brightness of an image created on said first image taking device, wherein
said brightness correction block selects one of a plurality of brightness correction patterns, which have each been prepared in advance as a pattern to be used in brightness correction, on the basis of said computed change of the thickness of said slide glass and makes use of said selected brightness correction pattern in order to correct the brightness of said image.

* * * * *